US008225375B2

(12) United States Patent
Tsuchiya et al.

(10) Patent No.: US 8,225,375 B2
(45) Date of Patent: Jul. 17, 2012

(54) INFORMATION PROCESSING SYSTEM, INFORMATION PROCESSING APPARATUS AND METHOD AND PROGRAM THEREFOR

(75) Inventors: Masakazu Tsuchiya, Nagoya (JP); Motonori Ueki, Nagoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1178 days.

(21) Appl. No.: 11/964,699

(22) Filed: Dec. 26, 2007

(65) Prior Publication Data
US 2008/0178265 A1 Jul. 24, 2008

(30) Foreign Application Priority Data

Dec. 28, 2006 (JP) .................................. 2006-356651
Dec. 10, 2007 (JP) .................................. 2007-318395

(51) Int. Cl.
*G06F 7/04* (2006.01)
(52) U.S. Cl. .......................................................... 726/3
(58) Field of Classification Search .......... 713/170–173, 713/168; 726/3, 5–10, 27, 28
See application file for complete search history.

(56) References Cited

U.S. PATENT DOCUMENTS

| | | | | |
|---|---|---|---|---|
| 5,903,721 | A * | 5/1999 | Sixtus ................................ | 726/2 |
| 7,503,066 | B2 * | 3/2009 | Tatebayashi et al. ............ | 726/17 |
| 2003/0234718 | A1 | 12/2003 | Fujisawa et al. ................ | 340/5.1 |
| 2005/0239447 | A1 * | 10/2005 | Holzman et al. ............ | 455/414.3 |
| 2006/0168643 | A1 * | 7/2006 | Howard et al. .................... | 726/2 |
| 2006/0212717 | A1 * | 9/2006 | Ito et al. ........................ | 713/186 |
| 2007/0118758 | A1 * | 5/2007 | Takahashi et al. ............ | 713/186 |
| 2008/0140640 | A1 * | 6/2008 | Raff .................................. | 707/5 |
| 2008/0301057 | A1 * | 12/2008 | Oren ................................ | 705/71 |

FOREIGN PATENT DOCUMENTS

| | | |
|---|---|---|
| JP | 9193577 A | 7/1997 |
| JP | 2000194823 A | 7/2000 |
| JP | 2001155078 A | 6/2001 |
| JP | 2003006546 A | 1/2003 |
| JP | 2004005580 A | 1/2004 |
| JP | 2005087590 A | 4/2005 |
| JP | 2006-099714 | 4/2006 |
| JP | 2006209370 A | 8/2006 |

OTHER PUBLICATIONS

Japanese Office Action regarding Japanese Patent Application No. JP2009-059293.

* cited by examiner

*Primary Examiner* — Beemnet Dada
(74) *Attorney, Agent, or Firm* — Fitzpatrick, Cella, Harper & Scinto

(57) ABSTRACT

The invention is to alleviate cumbersome operations of manager such as registration and deletion of authentication information. A card ID read from an IC card is transmitted to an IC card authentication server to obtain a first authentication result, and when the first authentication result indicates a successful authentication, the use of a composite apparatus is permitted. When the first authentication result indicates a failed authentication, an input user name is transmitted to a directory service server to obtain a second authentication result, and, when the second authentication result indicate a successful authentication, the card ID failing the authentication and the user name succeeding in the authentication are transmitted for requesting a registration to an IC card authentication server, which, receiving the request, registers the card ID and the user name in the registration request in combination in an authentication table.

13 Claims, 18 Drawing Sheets

CONSTRUCTION OF COMPOSITE APPARATUS

CONSTRUCTION OF IC CARD AUTHENTICATION SERVER 200

EXAMPLE OF LOG-IN SCREEN

EXAMPLE OF AUTHENTICATION FAILURE SCREEN

FIG. 9
EXAMPLE OF REGISTRATION SCREEN

ENTER USER NAME AND PASSWORD,
AND PRESS "REGISTRATION" BUTTON

■ USER NAME

1301

INPUT BY TOUCHING FIELD

■ PASSWORD

1302

INPUT BY TOUCHING FIELD

■ DOMAIN NAME

AFTER THE INPUTS, PRESS ID KEY

1304

1303 — ◄ TO TOP

RGISTRATION ↵

☰ SYSTEM STATUS/TERMINATE ►

EXAMPLE OF REGISTRATION COMPLETION SCREEN

EXAMPLE OF REGISTRATION FAILURE SCREEN

EXAMPLE OF AUTHENTICATION TABLE      504

| CARD ID | USER NAME | LATEST LOG-IN DATE |
|---|---|---|
| 12345678 | ABC | 20061130 |
| ... | ... | ... |
| ... | ... | ... |

LOG      506

| DATE AND TIME OF REGISTRATION | CARD ID | USER NAME |
|---|---|---|
| 200611301530 | 12345678 | ABC |
| ⋮ | ⋮ | ⋮ |

EXAMPLE OF SETTING FILE

| ITEM | VALUE |
|---|---|
| USER INFORMATION HOLDING TIME | 7 |

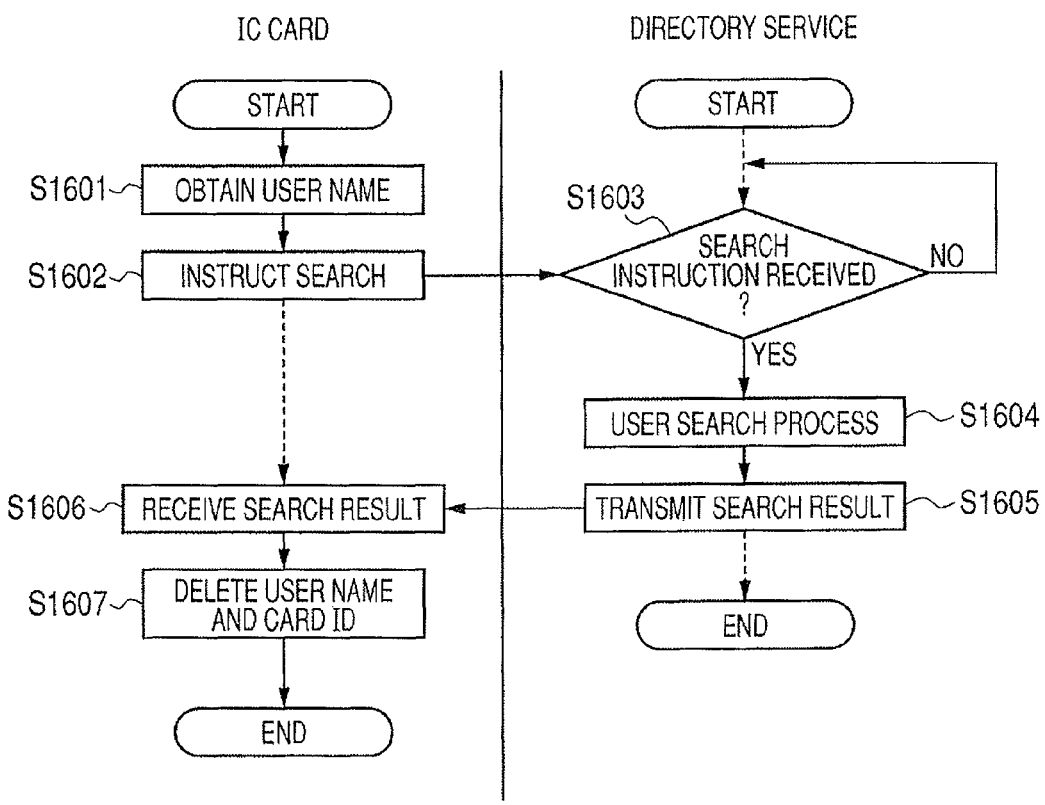

FIG. 20

MEMORY MEDIUM SUCH AS FD/CD-ROM

| DIRECTORY INFORMATION |
|---|
| FIRST DATA PROCESSING PROGRAM<br>PROGRAM CODES CORRESPONDING TO STEPS IN FLOW CHART SHOWN IN FIG. 6 |
| SECOND DATA PROCESSING PROGRAM<br>PROGRAM CODES CORRESPONDING TO STEPS IN FLOW CHART SHOWN IN FIG. 12 |
| THIRD DATA PROCESSING PROGRAM<br>PROGRAM CODES CORRESPONDING TO STEPS IN FLOW CHART SHOWN IN FIG. 15 |
| FOURTH DATA PROCESSING PROGRAM<br>PROGRAM CODES CORRESPONDING TO STEPS IN FLOW CHART SHOWN IN FIG. 16 |
| FIFTH DATA PROCESSING PROGRAM<br>PROGRAM CODES CORRESPONDING TO STEPS IN FLOW CHART SHOWN IN FIG. 18 |
| |

MEMORY MAP OF MEMORY MEDIUM

EXAMPLE OF BLACK LIST TABLE    507

| OLD CARD ID | USER NAME | DATE OF RECORD DELETION |
|---|---|---|
| 12345678 | ABC | 20070706 |

EXAMPLE OF REGISTRATION PROHIBITION SCREEN

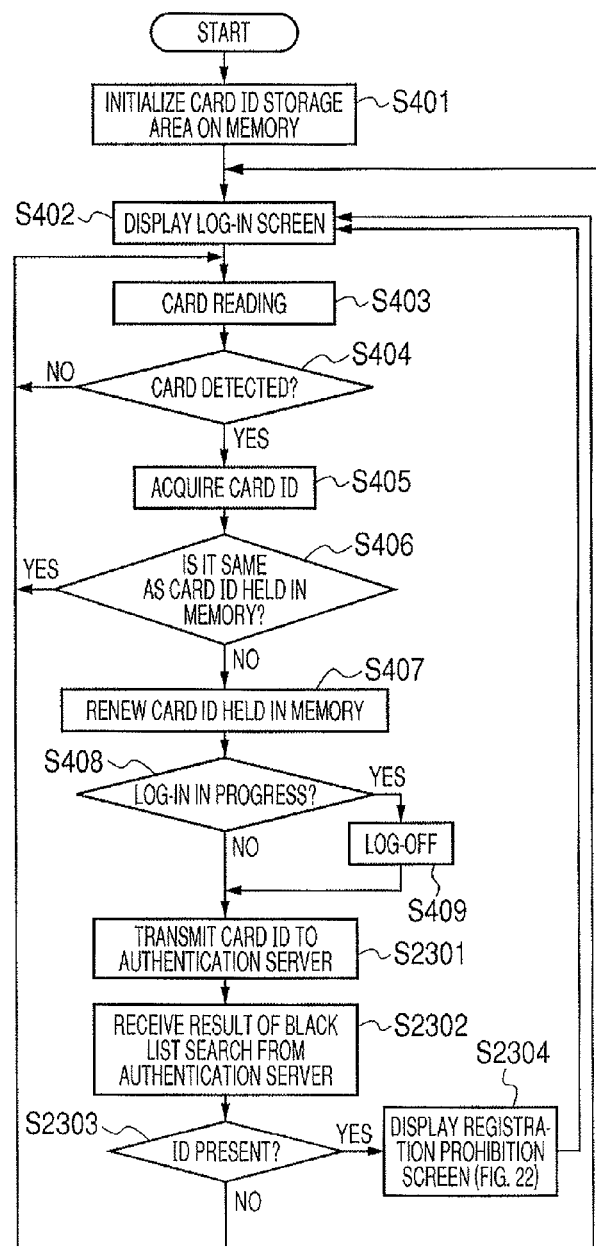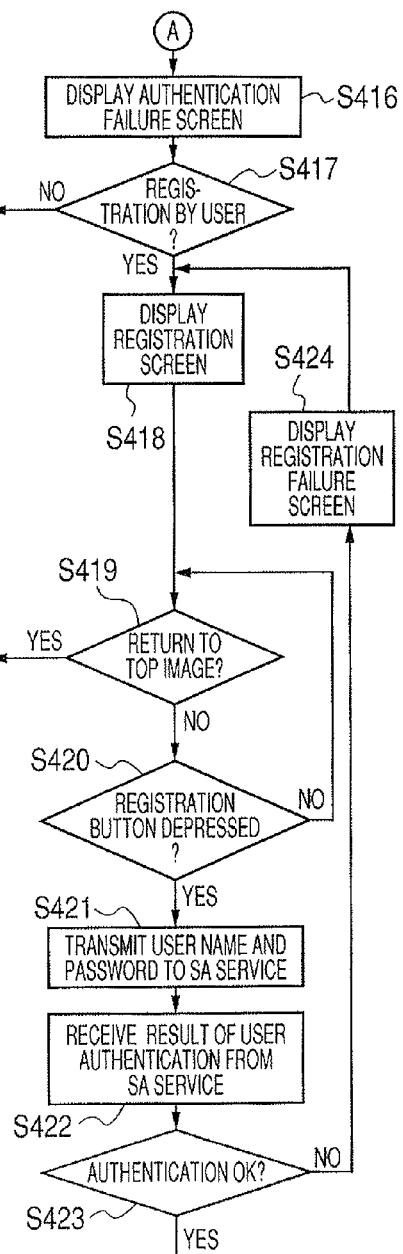
FIG. 23

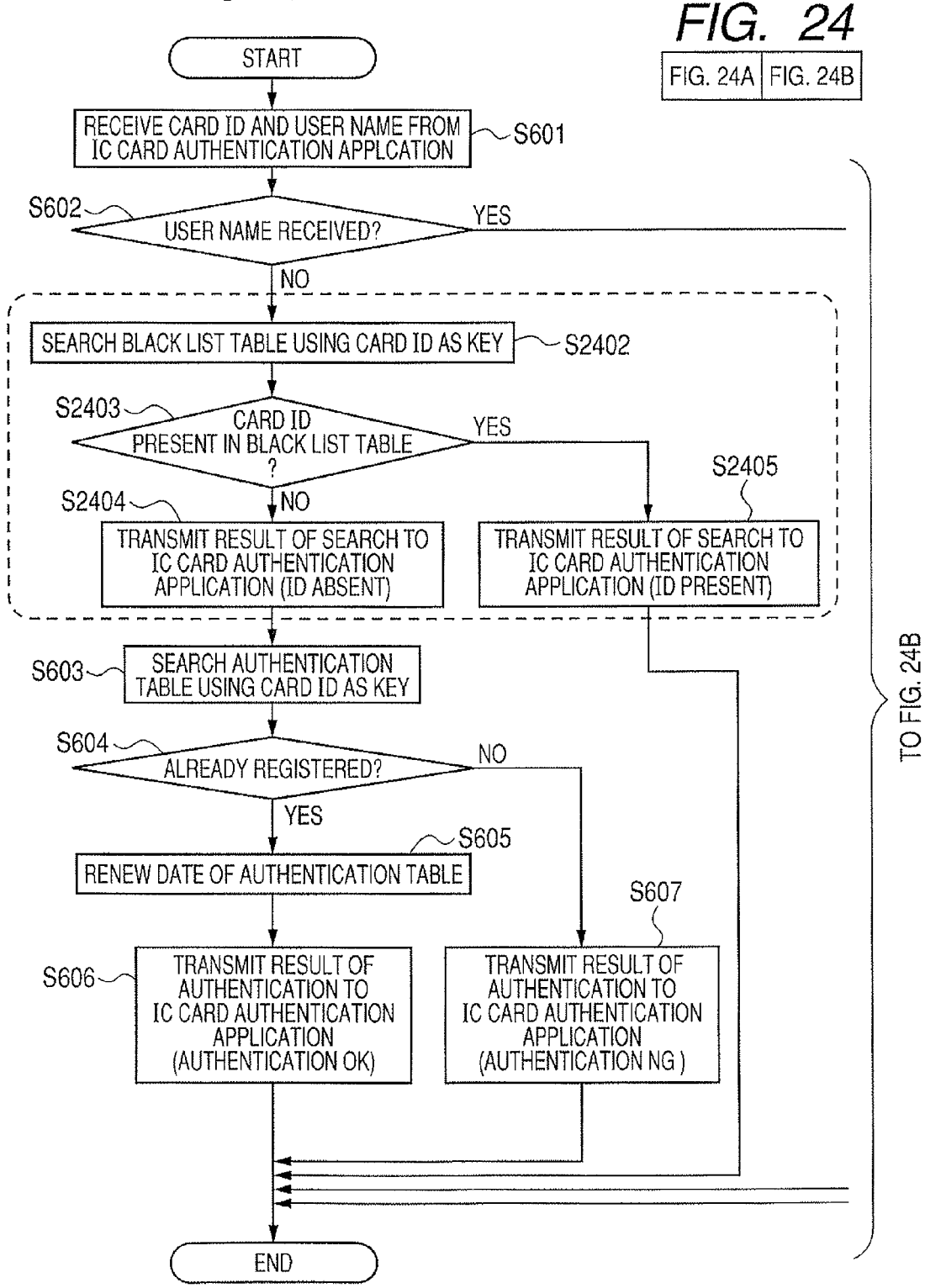

EXAMPLE OF OVERWRITE CONFIRMATION SCREEN

INFORMATION PROCESSING SYSTEM, INFORMATION PROCESSING APPARATUS AND METHOD AND PROGRAM THEREFOR

BACKGROUND OF THE INVENTION

1. Field of the Invention

The present invention relates to a registration control for authenticating information in an information processing system, in which one or plural information processing apparatuses, a first authentication server and a second authentication server can communicate through a communication medium.

2. Description of the Related Art

There has been known a printing system capable of so-called "pull-print" operation, in which a user makes a request for printing from a printing apparatus to print data temporarily accumulated on a server, thereby outputting the print data from such printing apparatus. Thus, in case of a printing operation from an application, the user can obtain the output of the print data not from a specified printing apparatus but from a desired printing apparatus. See Japanese Patent Laid-Open No. 2006-99714, for example.

The printing procedure in a printing system is executed for example in the following manner.

When the user puts an IC card on an IC card reader connected to the printing apparatus, the IC card reader detects a UID (unique ID) of the IC card. Then the printing apparatus, in order to determine whether the user has the right to use, refers to an authentication table, stored in an authentication server and setting whether the log-in based on UID is possible or not, thereby executing an authentication process for the user.

Then, when the log-in is enabled as the result of the authentication process, the printing apparatus acquires the print data of the user, temporarily stored in the server, and executes the printing operation.

A manager, who executes management (maintenance) of the authentication table, executes a registration of UID in the authentication table or a deletion thereof from the authentication table, when a new user uses the printing apparatus or when a user no longer uses the printing apparatus.

In the prior technology described above, with an increase in the number of users utilizing the printing apparatus, the manager is required to more frequently execute registration and deletion of the authentication information such as UID in or from the authentication table, whereby the trouble of the manager increases in managing the authentication table.

Also in the prior technology, the user can register plural IC cards (authentication information such as UID) in the authentication table, and can therefore register not only the IC card of such user but also an IC card of another person. For this reason, the user may be able to print data of a person other than the user.

For example in a case that the IC card of a user A is registered in the authentication table while the IC card of another user B is not yet registered, the user A is capable of registering the user information of the user A, erroneously by the IC card of the user B, in the authentication table.

In such case, therefore, when the user B tries to print the print data by placing the IC card on the reader, as the print data is coupled with the registered user name, the user B is unable to obtain his print data while is capable of obtaining the print data of the user A, thereby resulting in a deteriorated security.

SUMMARY OF THE INVENTION

An object of the present invention is to provide a system capable of alleviating the cumbersome operations such as registration and deletion of the authentication information, to be executed by the manager.

The aforementioned object can be accomplished, according to the present invention, by an information processing system, in which one or plural information processing apparatuses, a first authentication server storing first authentication information for permitting use of the information processing apparatus, and a second authentication server storing at least second authentication information for identifying a user, are capable of communication through a communication medium, wherein the first authentication server includes an authentication information storing unit configured to store first authentication information for permitting use of the information processing apparatus, a determination unit configured to determine whether the first authentication information is stored in the authentication information storing unit in order to execute an authentication based on the first authentication information received from the information processing apparatus, an enquiry unit configured to enquire registration of the first authentication information to the information processing apparatus, when the determination unit determines that the first authentication information received from the information processing apparatus is not stored in the authentication information storing unit, a first request unit that is configured, upon receiving a request for registration from the information processing apparatus as a response to the enquiry by the enquiry unit, to request an authentication based on second authentication information for identifying the user contained in the request for registration to the second authentication server, and a registration unit that is configured, in response to a reception of a result indicating that the second authentication information is registered in the second authentication server from the second authentication server as a response to the request by the first request unit, to register the second authentication information and the first authentication information that is determined by the determination unit as not stored in the authentication information storing unit in mutual combination in the authentication information storing unit, and wherein the information processing unit includes a second request unit configured to transmit the input first authentication information to the first authentication server thereby requesting an authentication based on the first authentication information to the first authentication server, a result acquiring unit configured to acquire a result based on the determination by the determination unit from the first authentication server in response to the request from the second request unit, a permission unit configured to permit use of the information processing apparatus when the authentication is determined as successful based on the result acquired by the result acquiring unit, and a registration request unit that is configured, in the case that the authentication is determined as failed based on the result acquired by the result acquiring unit and in the case of receiving an enquiry for the registration of the first authentication information, to transmit the second authentication information for identifying the user input from an operation unit to the first authentication server thereby requesting a registration.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a schematic view illustrating an example of a user registration screen in the print system of the present invention.

FIG. 18 is a flow chart illustrating an example of a fifth control process sequence in the print system of the present invention.

FIG. 19 is a view illustrating a part of an authentication table 1900 (second authentication table) stored in an HD 211 of the directory service server 300.

FIG. 20 is a view for explaining a memory map of a recording medium (memory medium) for storing various data processing programs, readable by the devices constituting the print system of the present invention.

DESCRIPTION OF THE EMBODIMENTS (First Exemplary Embodiment)

In the following, exemplary embodiments of the present invention will be described in detail, with reference to the accompanying drawings.

Figure 1:
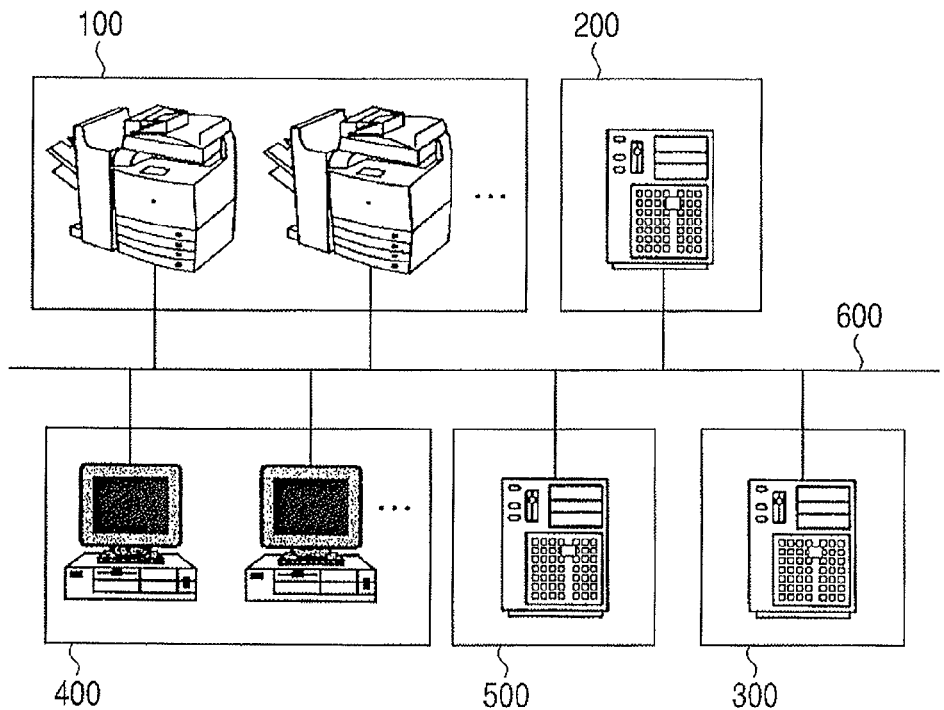
FIG. 1 is a system view illustrating an example of construction of a print system in which a printing apparatus of the present invention is applicable.

<Description of FIG. 1 (System Construction)>

FIG. 1 is a system view illustrating an example of construction of a print system in which a printing apparatus of the present invention is applicable.

As illustrated in FIG. 1, in the print system of the present exemplary embodiment, one or plural composite apparatuses 100, an IC card authentication server 200, a directory service server 300, one or plural computers 400 (for example provided for respective users), and a print data accumulation server 500 are connected through a network 600 (for example a LAN).

In the computer 400, installed is a printer driver, which is capable of generating print data based on data received from an application program, transmitting the print data to a print data accumulation server 500 for storage in a predetermined storage position (spooling area) of the print data accumulation server 500.

Also the print data accumulation server 500 transfers the print data, stored in the predetermined storage position, to the composite apparatus 100 based on an externally received command.

As another construction, instead of the print data accumulation server 500, the composite apparatus 100 may be used as the print data accumulation server.

The IC card authentication server 200 stores an IC card authentication table, and, in response to an authentication request by an IC card from the composite apparatus 100, executes an authentication process utilizing the IC card authentication table.

The composite apparatus 100, upon receiving a print request from a user specified by the authentication process, acquires the print data of such user stored in the predetermined storage position of the print data accumulation server 500 and executes a printing process. In addition to the printing process, the composite apparatus 100 can be used, when authenticated by an IC card, for scanning and copying functions.

The directory service server 300 unitarily stores and manages information on the hardware resources such as servers, clients, printers and the like present on the network, and attributes of the users utilizing the same (including log-in user name and password of the computer 400 (such as log-in user name and password of Microsoft Windows (registered trademark))) and access rights thereof, and for example a server having an active directory function.

A CPU 301 of the composite apparatus 100, upon acquiring a card ID of an IC card, transmits such card ID to the IC card authentication server 200.

The CPU of the IC card authentication server 200 executes an authentication process by the received card ID and transmits the result of authentication to the composite apparatus 100.

When the authentication is not possible, the CPU of the IC card authentication server 200 transmits, to the composite apparatus 100, a request for input of user information (for example user name and password (FIG. 19) managed by the directory service server 300).

Upon receipt of the request for input of the user information, the composite apparatus 100 transmits the user information, input by the operator, to the IC card authentication server 200.

Then the CPU of the IC card authentication server 200 transmits the user information to the directory service server 300, and, upon receiving the user information, the directory service server 300 executes the authentication process and transmits the result of authentication to the IC card authentication server 200.

The construction is featured by a fact that the IC card authentication server 200 discards the information in the case that the authentication is not possible in the directory service server 300 and the IC card authentication server 200 registers the user information (user name) and the card ID in the case that the authentication is possible in the directory service server 300.

Figure 2:
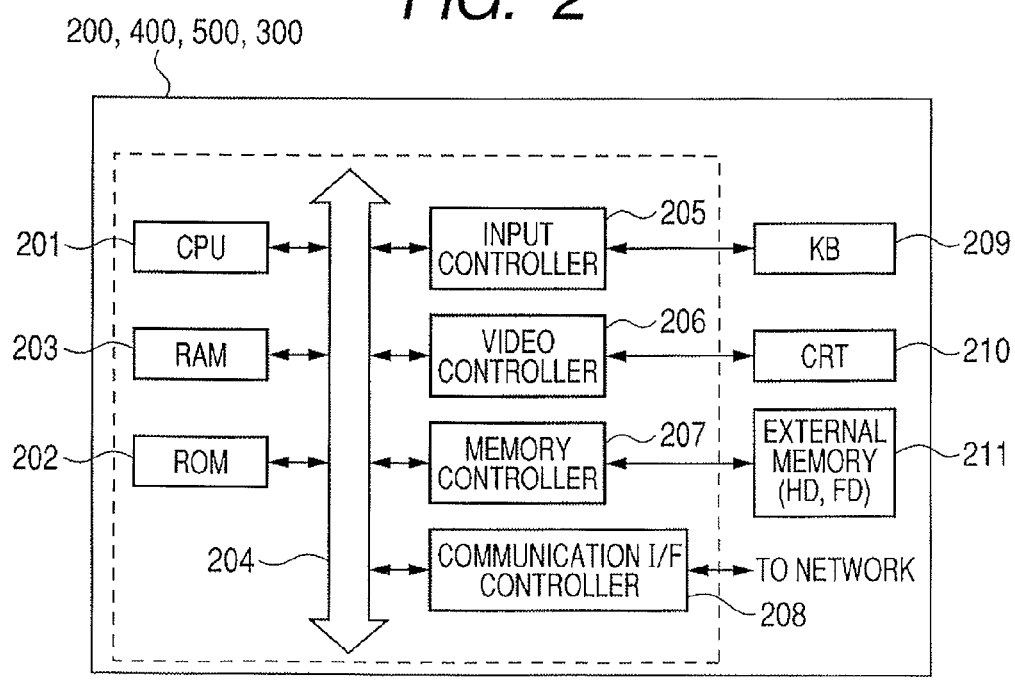
FIG. 2 is a block diagram illustrating a hardware construction of an information processing apparatus applicable to an IC card authentication server 200, a directory service server 300, a computer 400 and a print data accumulation server 500 illustrated in FIG. 1.

<Description of FIG. 2 (Block Diagram)>

In the following described, with reference to FIG. 2, are the hardware constructions of the information processing apparatus applicable to the IC card authentication server 200, the directory service server 300, the computer 400 and the print data accumulation server 500 illustrated in FIG. 1.

FIG. 2 is a block diagram illustrating a hardware construction of the information processing apparatus applicable to the IC card authentication server 200, the directory service server 300, the computer 400 and the print data accumulation server 500 illustrated in FIG. 1.

Referring to FIG. 2, a CPU 201 comprehensively controls devices and controllers connected to a system bus 204. A ROM 202 or an external memory 211 stores BIOS (basic input/output system) which is a control program for the CPU 201, an operating system program (hereinafter referred to as OS) and various programs necessary, as described later, for realizing functions to be executed by servers and PCs.

A RAM 203 functions as a main memory and a work area of the CPU 201. The CPU 201 realizes various operations by loading a program, necessary for execution of process, from the ROM 202 or the external memory 211 into the RAM 203 and by executing thus loaded program.

An input controller 205 controls the input from a keyboard (KB) 209 and a pointing device such as an unillustrated mouse. A video controller 206 controls display on a CRT display (CRT) 210 and the like. Though FIG. 2 describes a CRT 210, the display device is not limited to a CRT but may be another display device such as a liquid crystal display. Such display is used by a manager when necessary.

A memory controller 207 controls access to the external memory 211 such as an external memory apparatus (hard disk (HD)), a flexible disk (FD), or a compact flash (registered trade name) memory connected to a PCMCIA card slot across an adaptor, for storing a boot program, various applications, font data, user files, editing files, and various data.

A communication I/F controller 208 executes connection and communication with an external device through a network 600, and executes an communication control process in the network. For example, a communication utilizing TCP/IP is possible.

The CPU 201 enables display on the CRT 210 by executing a developing (rasterizing) process of outline font in a display information area for example in the RAM 203. The CPU 201 also enables by an instruction by the user, for example by an unillustrated mouse cursor on the CRT 201.

Various programs to be described later for realizing the present invention are recorded in the external memory 211 and are loaded in the RAM 203, when necessitated, for execution by the CPU 201. Also definition files and information tables, to be used at the execution of the programs, are stored in the external memory 211.

Figure 3:
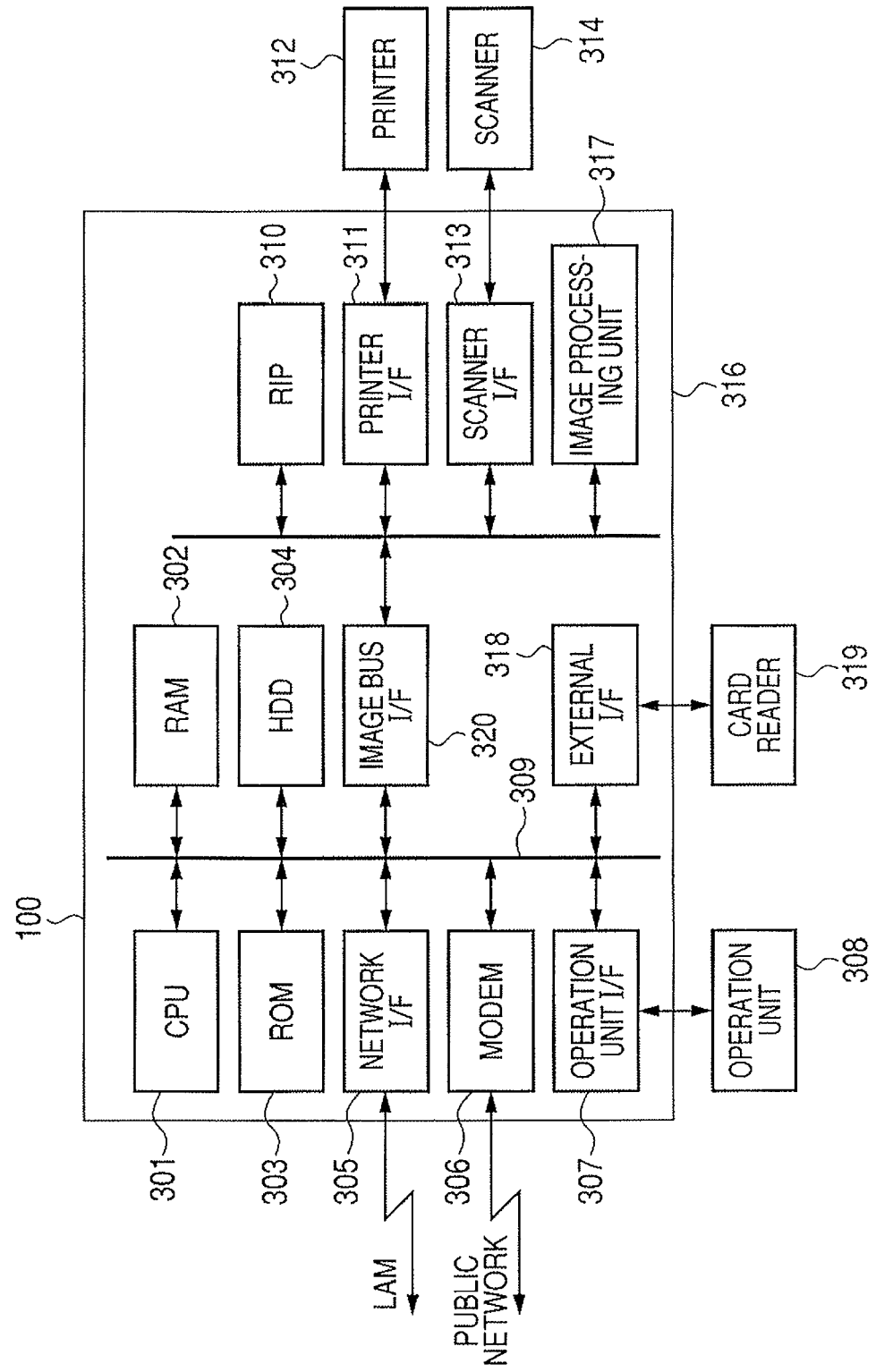
FIG. 3 is a block diagram illustrating an example of the hardware construction of a controller unit of the composite apparatus 100 illustrated in FIG. 1.

<Description of FIG. 3 (Block Diagram)>

In the following described is the hardware construction of a controller unit of the composite apparatus 100 as an image processing unit of the present invention illustrated in FIG. 3.

FIG. 3 is a block diagram illustrating an example of the hardware construction of a controller unit of the composite apparatus 100 illustrated in FIG. 1.

Referring to FIG. 3, a controller unit 316 is connected with a scanner unit 314 functioning as an image input device and a printer unit 312 functioning as an image output device, and is also connected with a LAN (for example LAN (network) illustrated in FIG. 1) or a public network (WAN) (for example PSTN or ISDN) for executing input and output of image data and device information.

The controller unit 316 includes a CPU 301 which is a processor for controlling the entire system, and a RAM 302 serving as a system work memory for the function of the CPU 301, and serving also as a program memory for storing programs and an image memory for temporarily storing image data.

A ROM 303 stores a boot program of the system and various control programs. An external memory apparatus (hard disk drive (HDD)) 304 stores various programs for system control, and image data. An IC card authentication application program (1011) to be described later is also stored in the external memory apparatus 304. Also a card ID storage area 1012 in FIG. 4, to be described later, is a memory area in the RAM 302 or the HDD 304.

An operation unit interface (operation unit I/F) 307 is an interface with an operation unit (UI) 308, and outputs image data, to be displayed on the operation unit 308, to the operation unit 308. Also operation unit interface 307 serves to transmit information, entered by the user of the system from the operation unit 306, to the CPU 301. The operation unit 308 is equipped with a display unit including a touch panel, and can execute various instructions by depressions (finger touches) of buttons displayed on the display unit by the user.

A network interface (network I/F) 305 is connected to a network (LAN) for executing input/output of data. A modem 306 is connected to a public network and executes data input/output such as a facsimile transmission/reception.

An external interface (external I/F) 318 is an I/F unit for accepting external inputs such as from USB, IEEE1394, printer ports and RS-232C, and, in the present exemplary embodiment, a card reader 319 for IC card reading required for authentication is connected to the external I/F 318. The CPU 301 controls, through the external I/F 318, the information reading of the IC card by the card reader 319, thereby acquiring the information read from the IC card. The devices described above are provided on a system bus 309.

An image bus interface (image bus I/F) 320 connects the system bus 309 and an image bus 315 for high-speed transmission of image data, and serves as a bus bridge for converting the data structure.

The image bus 315 is constituted of a PCI bus or an IEEE1394. On the image bus 315, disposed are following devices.

A raster image processor (RIP) 310 develops vector data such as PDL codes into a bit map image. A printer interface (printer I/F) 311 connects the printer unit 312 and the controller unit 316 and executes a synchronous/asynchronous conversion of image data. A scanner interface (scanner I/F) 313 connects the scanner unit 314 and the controller unit 316 and executes a synchronous/asynchronous conversion of image data.

An image processing unit 317 executes a correction, a working and an editing on input image data, and executes a printer correction and a conversion of resolution on output image data. In addition, the image processing unit 317 executes a rotation of image data, and a compression/expansion process such as JPEG on multi-value image data and JBIG, MMR or MH on binary image data.

A scanner unit 314 illuminates an image on an original paper and scans it with a CCD line sensor for conversion into an electrical signal as raster image data. The original sheets are set on a tray of an original feeder, and, in response to a reading start instruction by the user from the operation unit 308, the CPU 301 gives an instruction to the scanner unit 314 to execute a reading operation of the original images from the original sheets one by one by the feeder.

The printer unit 312 is a unit configured to convert raster image data into an image on a sheet, for example by an electrophotographic process utilizing a photosensitive drum or a photosensitive belt, or by an ink jet process utilizing ink discharge from a small nozzle array for direct image printing on a sheet, and any process may be adopted. The printing operation is activated by an instruction from the CPU 301. The printer unit 312 includes plural sheet feeding stages, with respectively corresponding sheet cassettes, for enabling selection of different sheet sizes or different sheet directions.

The operation unit 308 has an LCD display unit having a touch panel sheet thereon, for displaying an system operation screen, and when a displayed key is depressed, transmits the position information thereof to the CPU 301 through the operation unit I/F 307. Also the operation unit 308 is equipped with various operation keys, such as a start key, a stop key, an ID key and a reset key.

The start key of the operation unit 308 is used for example in starting a reading operation of the original image. The start key is equipped, in the center thereof, with a red-green two-color LED and indicates whether the start key is in a usable state by the color thereof. The stop key of the operation unit 308 serves to interrupt the operation in progress. The ID key of the operation unit 308 is used in inputting user ID of the user. The reset key is used in case of initializing the setting from the operation unit. The card reader 319 (corresponding to an IC card reader 319 to be described later) reads, under the control by the CPU 301, information stored in an IC card (for example Sony's Felica (registered trade mark)), and informs the CPU 301 of the read information through the external I/F 318.

Based on the above-described construction, the composite apparatus 100 can transmit the image data, read from the scanner unit 314, to the LAN (network), and can print the print data, received from the LAN (network), by the printer unit 312.

It can also execute facsimile transmission of the image data, read from the scanner unit 314, through the modem 306 to the public network, and can output the image data, received by facsimile reception from the public network, by the printer unit 312.

Figure 4:
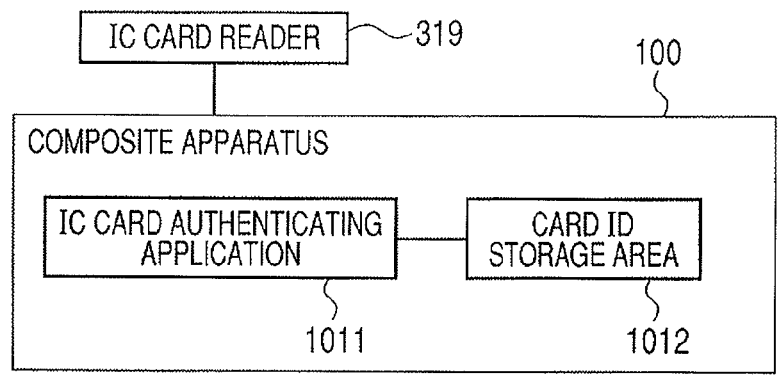
FIG. 4 is a block diagram illustrating an example of the software construction of the composite apparatus 100 illustrated in FIG. 1.

<Description of FIG. 4>

FIG. 4 is a block diagram illustrating an example of the software construction of the composite apparatus 100 illustrated in FIG. 1, wherein components same as those in FIG. 3 are presented by same symbols.

As illustrated in FIG. 4, an IC card reader 319 is communicably connected to the composite apparatus 100.

In the memory area of the HDD 304 or RAM 302 of the composite apparatus 100, constructed are an IC card authentication application (program) 1011 and a card ID storage area 1012.

The IC card authentication application 1011 is realized by executing a program, read from the ROM 303 or the HDD 304 into the RAM 302, by the CPU 301 of the composite apparatus 100 illustrated in FIG. 3.

The CPU 301 of the composite apparatus 100 detects the IC card through the IC card reader 319 and acquires a card ID stored in the IC card, by means of the IC card authentication application 1011. The CPU 301 of the composite apparatus 100 stores the acquired card ID in the card ID storage area 1012.

The card ID is information capable of specifying the user, such as a production number UID (unique number) of the IC card or person specifying information allowing to specify a person.

Figure 5:
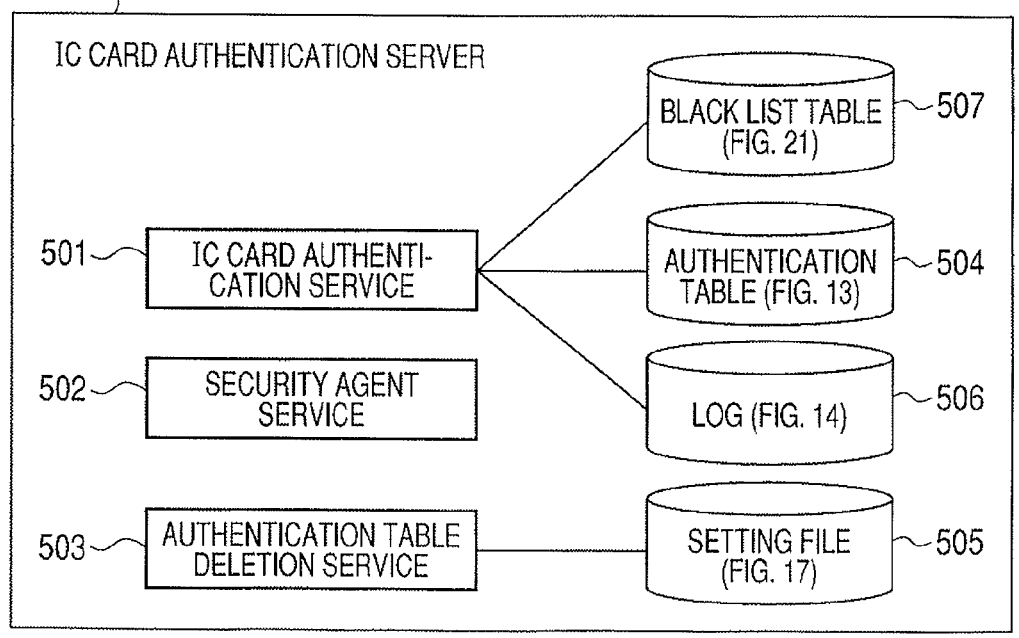
FIG. 5 is a block diagram illustrating an example of the software construction of the IC card authentication server 200 illustrated in FIG. 1.

<Description of FIG. 5>

FIG. 5 is a block diagram illustrating an example of the software construction of the IC card authentication server 200 illustrated in FIG. 1.

In a memory area of an external memory 211 or a RAM 203 of the IC card authentication server 200, stored are an IC card authentication service 501, a security agent service 502, an authentication table deletion service 503, an authentication table 504 (first authentication table) (FIG. 13), and a setting file 505.

The IC card authentication service 501, the security agent service 502, and the authentication table deletion service 503 are realized by executing the program, read from the ROM 202 or the HDD 211 to the RAM 203, by the CPU 201 of the IC card authentication server 200.

The IC card authentication service 501 registers a card ID, a user name and a latest log-in date in the authentication table 504 and searches a card ID, a user name and a latest log-in date registered in the authentication table.

Figures 21, 22:
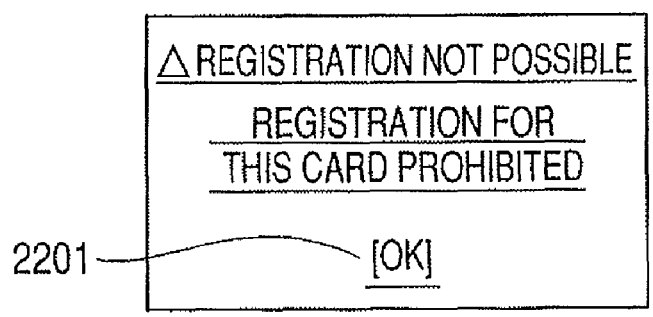
FIG. 21 is a schematic view illustrating an example of the construction of a black list table 507 of the present invention.
FIG. 22 is a schematic view illustrating an example of a registration prohibition screen in the print system of the present invention.

Also the IC card authentication service 501, upon receiving an overwrite request for the card ID, deletes the card ID, the user name and the latest log-in date registered in the authentication table 504 and registers such information in a black list table 507 (FIG. 21). Thereafter, it registers the card ID, the user name and the latest log-in date in the overwrite request in the authentication table 504.

Also the authentication table deletion service 503 deletes the card ID, the user name and the latest log-in date in the authentication table 504, based on a user information holding period stored in the setting file 505 to be described later.

Figure 6:
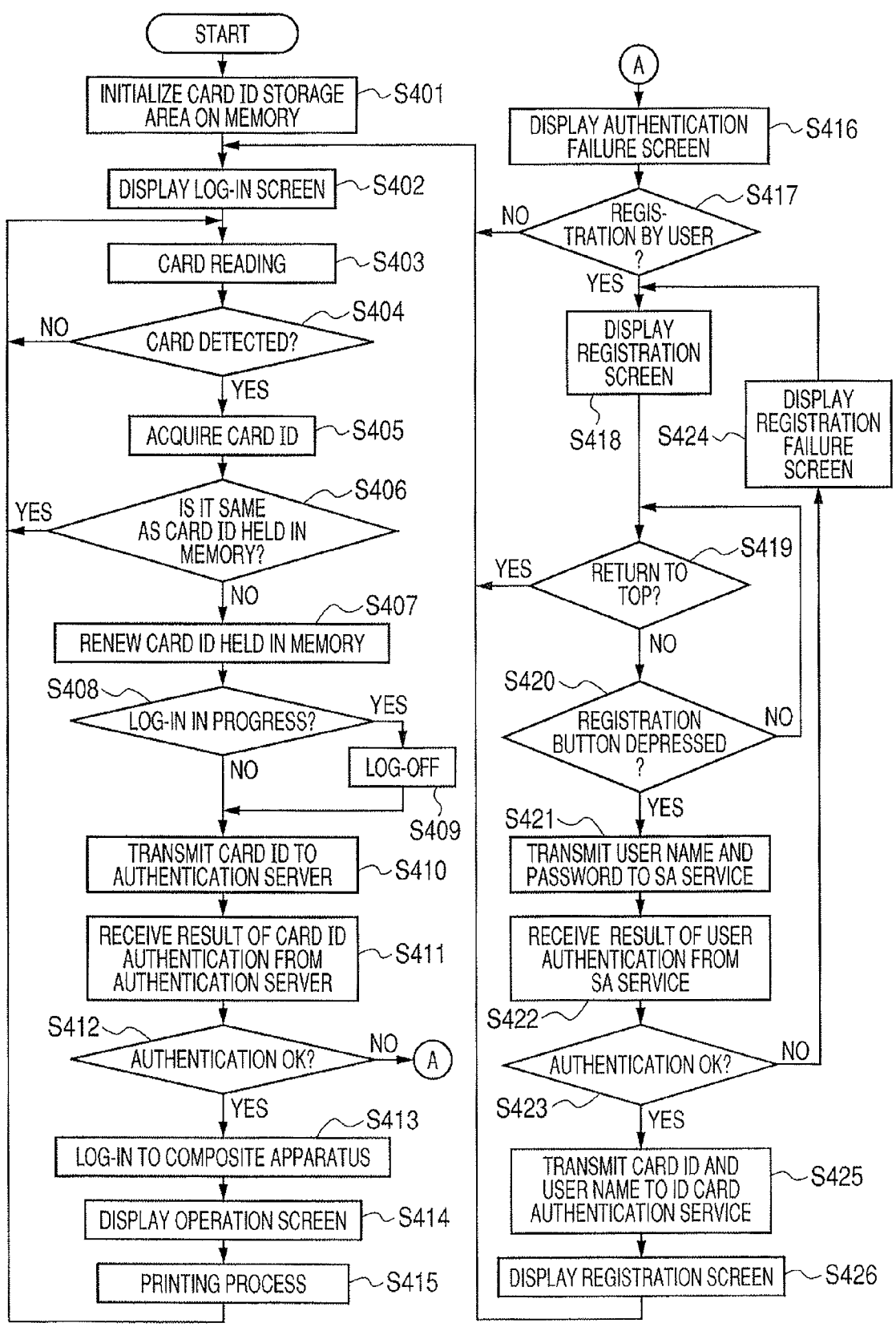
FIG. 6 is a flow chart illustrating an example of a first control process sequence in the print system of the present invention.

<Description of FIG. 6>

In the following, described is a process in the IC card authentication application 1011 in the composite apparatus 100, with reference to a flow chart in FIG. 6.

FIG. 6 is a flow chart illustrating an example of a first control process sequence in the print system of the present invention, and corresponds to the process by the IC card authentication application 1011 in the composite apparatus 100 in FIG. 5. Thus it is realized by executing a program read from the ROM 303 or HDD 304 into the RAM 302, by the CPU 301 of the composite apparatus 100 illustrated in FIG. 3. In the flow chart, S401 to S426 indicate process steps.

Figure 7:
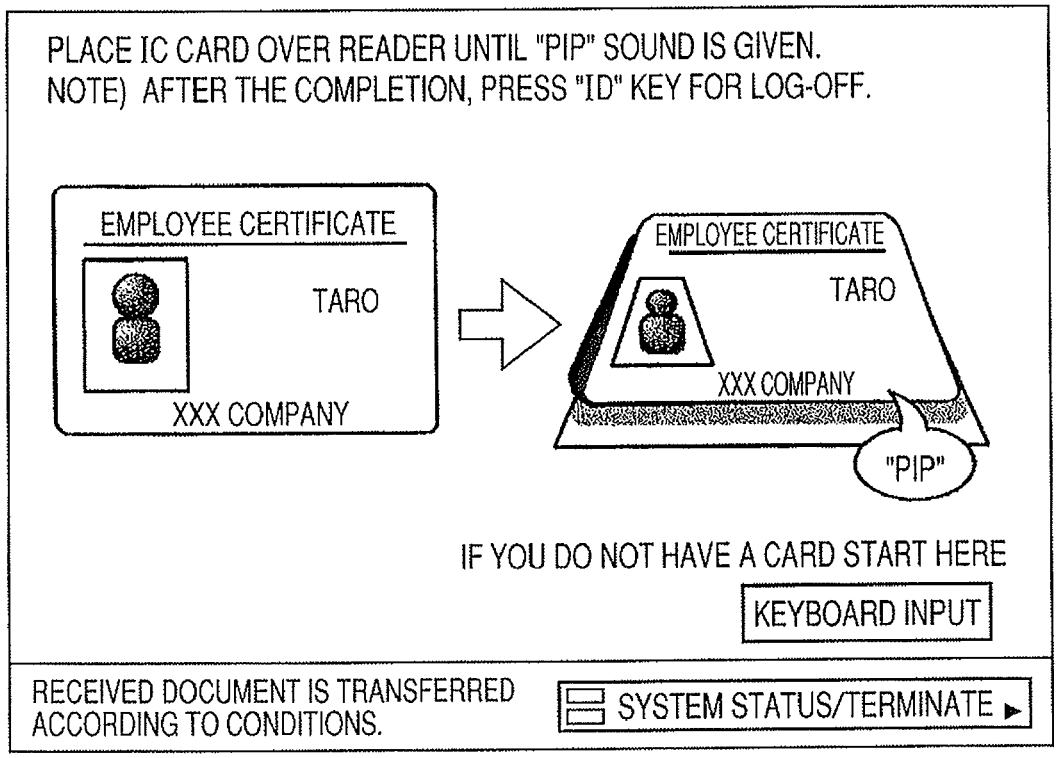
FIG. 7 is a schematic view illustrating an example of a log-in screen in the print system of the present invention.

When the composite apparatus 100 is activated, the CPU 301 of the composite apparatus 100 initializes, in a step S401, the card ID storage area 1012 on the memory (external memory 211 or RAM 203), and displays, in a step S402, a log-in screen illustrated in FIG. 7 on the display unit of the operation unit 308. In the initialization of the card ID storage area 1012 in the step S401, the CPU 301 of the composite apparatus 100 stores "NULL" in the card ID storage area.

FIG. 7 is a schematic view illustrating an example of the log-in screen in the print system of the present invention.

Then, in a step S403, the CPU 301 of the composite apparatus 100 executes an IC card reading process. Then, when the user puts the IC card on the IC card reader 319, the CPU 301 of the composite apparatus 100 detects the IC card and acquires the card ID.

Then in a step S404, the CPU 301 of the composite apparatus 100 determines whether the IC card has been detected, and, upon determining that the IC card is not detected, the sequence returns to the step S403 for repeating the IC reading process.

On the other hand, in a step S404, the CPU 301 of the composite apparatus 100, upon determining that the IC card is detected, acquires the card ID from the detected IC card in a step S405. The CPU 301 of the composite apparatus 100 stores the acquired card ID in a memory medium such as RAM 203.

Then in a step S406, the CPU 301 of the composite apparatus 100 determines whether the card ID acquired in the step S405 is same as the card ID stored in the card ID storage area 1012, and, in case of determination as same (S406: YES), returns the sequence to the step S403 for repeating the IC card reading process.

On the other hand, in a step S406, in the case that the card ID acquired in the step S405 is determined as not same as the card ID stored in the card ID storage area 1012 (S406: NO), the CPU 301 of the composite apparatus 100 renews, in a step S407, the card ID stored in the card ID storage area 1012 to the card ID acquired in the step S405.

Then in a step S408, the CPU 301 of the composite apparatus 100 determines whether another user is already logged-in, and, upon determining that another user is already logged in (S408: YES), forcedly causes such user to log off in a step S409 and advances to a step S410.

Thus, in the case of a card ID input different from a card ID for which the use of the composite apparatus is permitted, the permission of use for such card ID for which the use is permitted is forcedly canceled (log-off) thereby enabling a proper user to log-in and enabling the process of the composite apparatus 100 by the proper user. The printing process is not executed by thus logged-off user can be executed with a higher security.

The composite apparatus 100, upon receiving a print request from a user specified by such authentication process, acquires the print data of such user, stored in a predetermined storage position of the print data accumulation server 500, and executes a printing process.

On the other hand, when the step S408 determines that another user is not logged in, the CPU 301 of the composite apparatus 100 proceeds to a step S410. Thus, for a log-in request for a card number of a same user acquired by a palling process, the repeated log-in process is not executed, thereby avoiding an erroneous deletion of the print data of the user by a repeated log-in process and enabling an optimum printing process.

Then, in a step S410, the CPU 301 of the composite apparatus 100 transmits the card ID, acquired in S405, to the IC card authentication service 501 of the IC card authentication server 200. Upon receiving the card ID, the IC card authentication service 501 searches whether the received card ID is registered (stored) in the authentication table, and transmits a result of authentication including the user name as information permitting the log-in if registered, or transmits a result of authentication containing information to prohibit (not permit) the log-in if not registered, to the composite apparatus 100.

Then in a step S411, the CPU 301 of the composite apparatus 100 receives the result of authentication from the IC card authentication service 501 of the IC card authentication server 200.

Then in the step S412, the CPU 301 of the composite apparatus 100 determines whether the result of authentication received in S411 is information permitting log-in (containing the user name), and, upon determining that the information permits the log-in (authentication OK) (S412: YES), proceeds to a step S413.

Then in the step S413, the CPU 301 of the composite apparatus 100 executes a log-in process to the composite apparatus 100 utilizing the user name, contained in the result of authentication received in S411, and displays, in a step S414, an operation screen (not shown) on the operation unit 308.

Then in the step S415, the CPU 301 of the composite apparatus 100, in response to an operation by the user on the operation screen, executes a printing process or the like for such user, and returns the process to a step S403.

On the other hand, in the case that the step S412 determines that the result of authentication received in S411 is not information permitting log-in (authentication NG) (S412: NO), the CPU 301 of the composite apparatus 100 displays, in a step S416, an authentication failure screen as illustrated in FIG. 8 on the operation unit 308 and awaits an instruction from the user.

Figure 8:
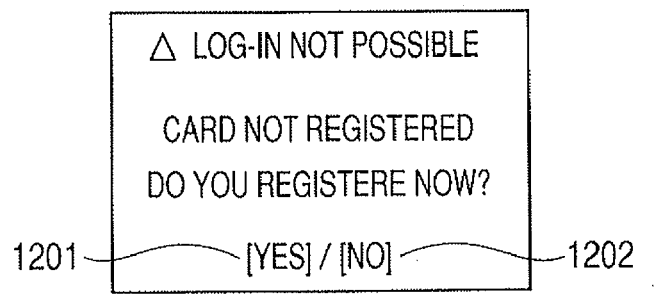
FIG. 8 is a schematic view illustrating an example of an authentication failure screen in the print system of the present invention.

FIG. 8 is a schematic view illustrating an example of an authentication failure screen in the print system of the present invention.

In FIG. 8, a YES button 1201 is to be touched in case of executing the user registration. A NO button 1202 is to be touched in case of not executing the user registration. The user can give an instruction by selectively touching the YES button 1201 or the NO button 1202.

When the YES button 1201 or the NO button 1202 is touched, CPU 301 of the composite apparatus 100 proceeds to a step S417.

In the step S417, the CPU 301 of the composite apparatus 100 determines whether a user registration is to be executed (whether YES button 1201 is touched), then, in a case of no user registration (NO button 1202 being touched) (S417: NO), returns to the step S402 and again displays the log-in screen illustrated in FIG. 7.

On the other hand, when the step S417 determines a user registration (YES button 1201 being touched) (S417: YES), the CPU 301 of the composite apparatus 100 displays, in a step S418, the registration screen illustrated in FIG. 9 on the operation unit 308.

FIG. 9 is a schematic view illustrating an example of a user registration screen in the print system of the present invention.

In FIG. 9, illustrated are a user name input column 1301 and a password input column 1302, in which the user name and the password, managed by the directory service server 300, are entered utilizing an unillustrated keyboard displayed on the operation unit 308 or unillustrated hardware keys of the operation unit 308.

A registration button 1304 is to be touched in case of executing the user registration. A top return button 1303 is to be touched in case of returning to the log-in screen illustrated in FIG. 7, without executing the user registration.

In the following, reference is made again to the flow chart in FIG. 6.

Then in a step S419, the CPU 301 of the composite apparatus 100 determines whether the top return button 1303 is touched, and, upon determining that the top return button 1303 is touched (S419: YES), returns to the step S402 to display again the log-in screen illustrated in FIG. 7.

On the other hand, in the case that the step S419 determines that the top return button 1303 is not touched (S419: NO), the CPU 301 of the composite apparatus 100 proceeds to the step S420.

In a step S420, the CPU 301 of the composite apparatus 100 determines whether the registration button 1304 is touched, and, upon determining that the registration button 1304 is not touched (S420: NO), returns to the step S419.

On the other hand, in the case that the step S420 determines that the registration button 1304 is touched (S420: YES), the CPU 301 of the composite apparatus 100 proceeds to the step S421.

In the step S421, the CPU 301 of the composite apparatus 100 transmits the user name and the password, entered in the user name input column 1301 and the password input column 1302, to the security agent service 502. The CPU 301 of the composite apparatus 100 stores the user name and the password, thus input, in a memory medium such as the RAM 302.

Then in a step S422, the CPU 301 of the composite apparatus 100 receives the result of user authentication from the security agent service 502 and determined, in a step S423, whether the result of user authentication is OK.

In the case that the step S423 determines that the result of user authentication is OK (S423: YES), CPU 301 of the composite apparatus 100 proceeds to a step S425.

Figure 10:
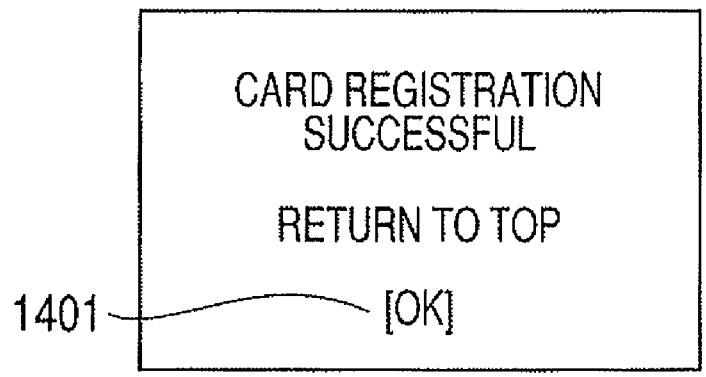
FIG. 10 is a schematic view illustrating an example of a registration completion screen in the print system of the present invention.

The CPU 301 of the composite apparatus 100 transmits, in a step S425, the card ID input by the user (acquired in the step S405) and the user name (input in the user name input column 1301) to the IC card authentication service 501, then receives, in a step S426, an OK for registration from the IC card authentication service 501 and displays a registration completion screen illustrated in FIG. 10.

In the step S425, the CPU 301 of the composite apparatus 100 acquires the card ID acquired in a step S405 and the user name from the memory medium such as the RAM 203, and transmits such card ID and the user name to the IC card authentication service 501 (request for registration).

FIG. 10 is a schematic view illustrating an example of a registration completion screen in the print system of the present invention.

In the registration completion screen illustrated in FIG. 10, when an OK button 1401 is touched, the CPU 301 of the composite apparatus 100 returns to the step S402 and again displays the log-in screen in FIG. 7.

On the other hand, in the case that the step S423 determines that the result of user authentication is NG (S423; NO), the CPU 301 of the composite apparatus 100 displays, in a step S424, a registration failure screen illustrated in FIG. 11.

Figure 11:
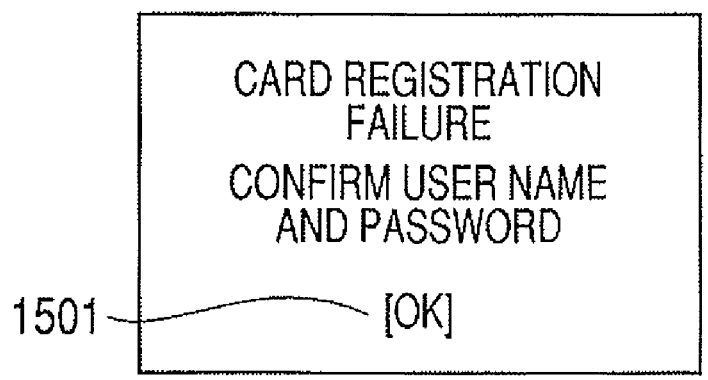
FIG. 11 is a schematic view illustrating an example of a registration failure screen in the print system of the present invention.

FIG. 11 is a schematic view illustrating an example of a registration failure screen in the print system of the present invention.

In the registration failure screen of FIG. 11, when an OK button 1501 is touched, the CPU 301 of the composite apparatus 100 returns to the step S402 and again displays the log-in screen illustrated in FIG. 7.

Figure 12:
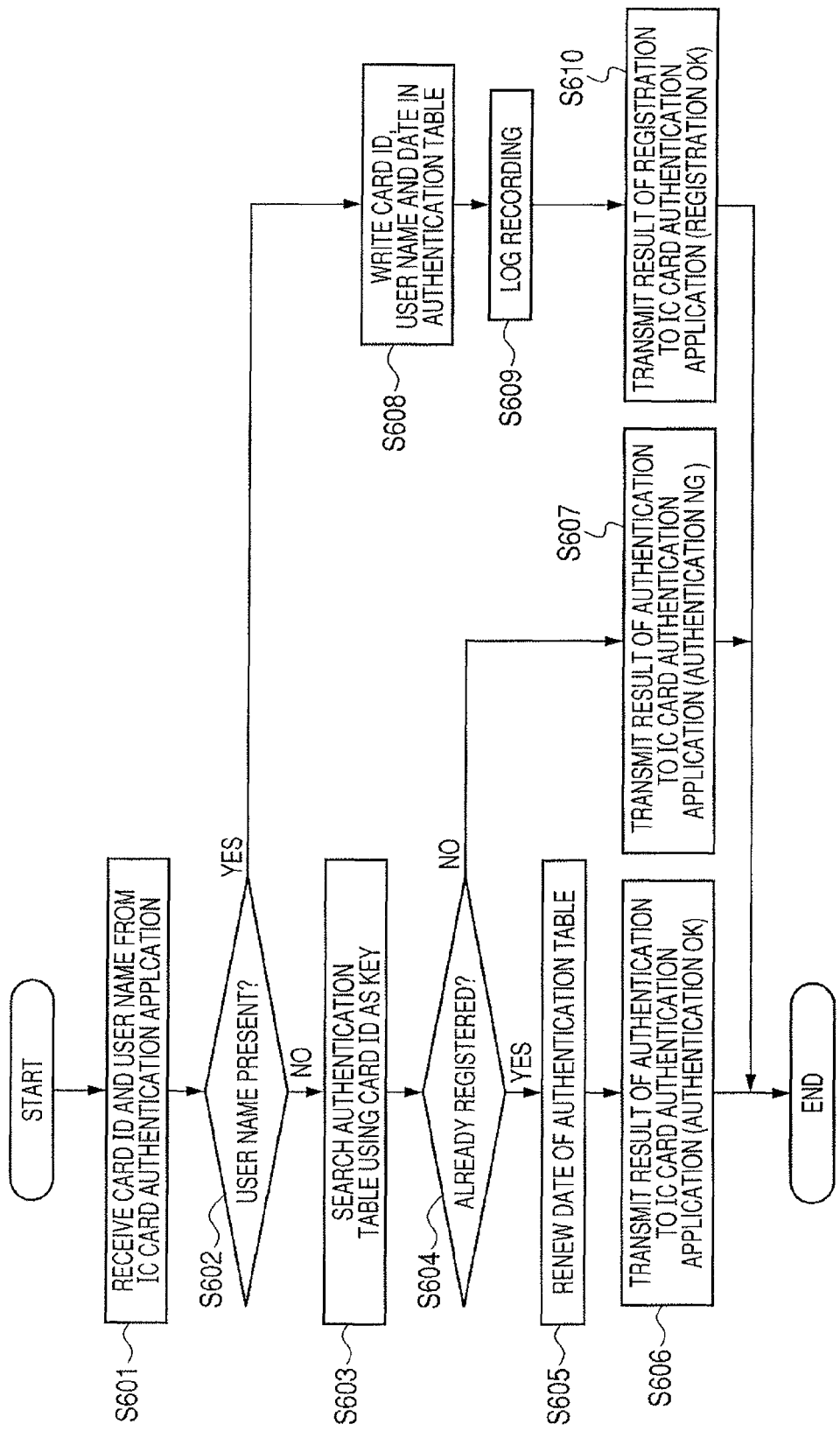
FIG. 12 is a flow chart illustrating an example of a second control process sequence in the print system of the present invention.

<Description of FIG. 12>

In the following, described is a process in the IC card authentication service 501 in the IC card authentication server 200, with reference to a flow chart in FIG. 12.

FIG. 12 is a flow chart illustrating an example of a second control process sequence in the print system of the present invention, and it corresponds to the process by the IC card authentication service 501 in the IC card authentication server 200 illustrated in FIG. 5. It is realized by executing a program read from the ROM 202 or HDD 211 into the RAM 203, by the CPU 201 of the IC card authentication server 200. In the flow chart, S601 to S610 indicate process steps.

At first, the CPU 201 of the IC card authentication server 200, upon receiving the card ID (user name) from the IC card authentication application 1011 of the composite apparatus 100 (S601), proceeds to a step S602.

In the step S602, the CPU 201 of the IC card authentication server 200 determines whether the received information contains the information of user name, and, upon determining that the received information does not contain the information of user name (S602: NO), recognizes the information as transmitted in S410 illustrated in FIG. 6, thereupon proceeding to a step S603.

Figures 13, 14, 15:
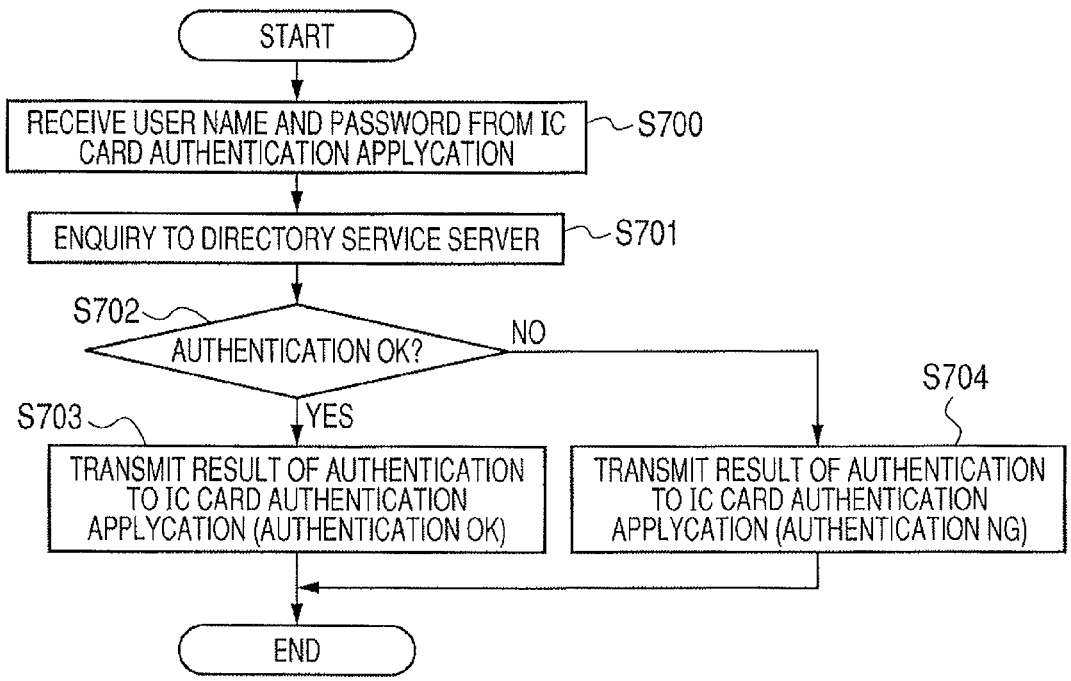
FIG. 13 is a view illustrating an example of the construction of an authentication table 504 illustrated in FIG. 5.
FIG. 14 is a view illustrating an example of the construction of a log 506 illustrated in FIG. 5.
FIG. 15 is a flow chart illustrating an example of a third control process sequence in the print system of the present invention.

In the step S603, the CPU 201 of the IC card authentication server 200 searches the authentication table 504 illustrated in FIG. 13, utilizing the card ID received in S601 as the key.

FIG. 13 is a view illustrating an example of the construction of an authentication table 504 illustrated in FIG. 5.

As illustrated in FIG. 13, the authentication table 504 stores information of a card ID, a user name and a latest log-in date. Each record (card ID, user name and latest log-in date) indicates information of each user.

Now reference is made again to the flow chart in FIG. 12.

In a step S604, the CPU 201 of the IC card authentication server 200 determines, based on the result of search in S603, whether the card ID received in S601 is already registered in the authentication table 504, and, upon determining that it is already registered (S604: YES), proceeds to a step S605.

In the step S605, the CPU 201 of the IC card authentication server 200 renews the date of the authentication table 504 to a current date, and transmits, in a step S606, a result of authentication indicating OK to the IC card authentication application 1011 of the composite apparatus 100, thereupon terminating the process of this flow chart.

On the other hand, in the case that the step S604 determines that the card ID received in S601 is not yet registered in the authentication table 504 (S604: NO), the process proceeds to a step s607.

In the step S607, the CPU 201 of the IC card authentication server 200 transmits a result of authentication indicating NG to the IC card authentication application 1011 of the composite apparatus 100, thereupon terminating the process of this flow chart. The results of authentication transmitted in S606 and S607 are received in S411 in FIG. 6.

On the other hand, in the case that the step S602 determines that the information received in S601 contains information of the user name (S602: YES), the information is recognized as information transmitted in S425 in FIG. 6, and the process proceeds to a step S608.

In the step S608, the CPU 201 of the IC card authentication server 200 writes the card ID, the user name and the current date, received in S601, into the authentication table 504. Thus, the CPU 201 of the IC card authentication server 200 registers (stores) the card ID, the user name and the current date, acquired in S601, into the authentication table 504 in mutual combination (mutual correspondence).

Then in a step S609, the CPU 201 of the IC card authentication server 200 writes the current date, and the card ID and the user name, received in S601, into a log 506. The result of authentication transmitted in S609 is received in S411 in FIG. 6.

FIG. 14 is a view illustrating an example of the construction of a log 506 illustrated in FIG. 5.

As illustrated in FIG. 14, the log 506 stores information of a date of registration, a card ID and a user name.

Now reference is made again to the flow chart in FIG. 12.

Then, in a step S610, the CPU 201 of the IC card authentication server 200 transmits the result of registration, indicating registration OK, to the IC card authentication application 1011 of the composite apparatus 100, thereupon terminating the process of this flow chart. The result of registration transmitted in S610 is received in S426 in FIG. 6.

<Description of FIG. 15>

In the following, described is a process in the security agent service 502 in the IC card authentication server 200, with reference to a flow chart illustrated in FIG. 15.

FIG. 15 is a flow chart illustrating an example of a third control process sequence in the print system of the present invention, corresponding to a process by the security agent service 502 in the IC card authentication server 200 illustrated in FIG. 5. Thus it is realized by executing a program read from the ROM 202 or HDD 211 into the RAM 203, by the CPU 201 of the IC card authentication server 200. In the flow chart, S700 to S703 indicate process steps.

At first, the CPU 201 of the IC card authentication server 200, upon receiving the user name and the password from the IC card authentication application 1011 of the composite apparatus 100 (S700), proceeds to a step S701. The user name and the password, received in S700, are transmitted in S421 in FIG. 6.

In the step S701, the CPU 201 of the IC card authentication server 200 transmits the user name and the password, received in S700, to the directory service server 300 and enquires the result of authentication.

The CPU 201 of the IC card authentication server 200, upon receiving the result of authentication from the directory service server 300, determines, in a step S702, whether the result of authentication in the directory service server 300 indicates OK for authentication.

In the case that the step S702 determines that the result of authentication in the directory service server 300 is OK (S702: YES), the CPU 201 of the IC card authentication server 200 transmits, in a step S703, the OK result of authentication to the IC card authentication application 1011, thereupon terminating the process in this flow chart.

On the other hand, in the case that the step S702 determines that the result of authentication in the directory service server 300 is NG (S702: NO), the CPU 201 of the IC card authentication server 200 transmits, in a step S704, the NG result of authentication to the IC card authentication application 1011, thereupon terminating the process in this flow chart.

The result of authentication transmitted in S703 or S704 is received in S422 in FIG. 6.

In the print system of the present invention, as described in the foregoing, the result of authentication can be registered in the IC card authentication server 200 thereby permitting use of the printing apparatus.

Figures 16, 17:
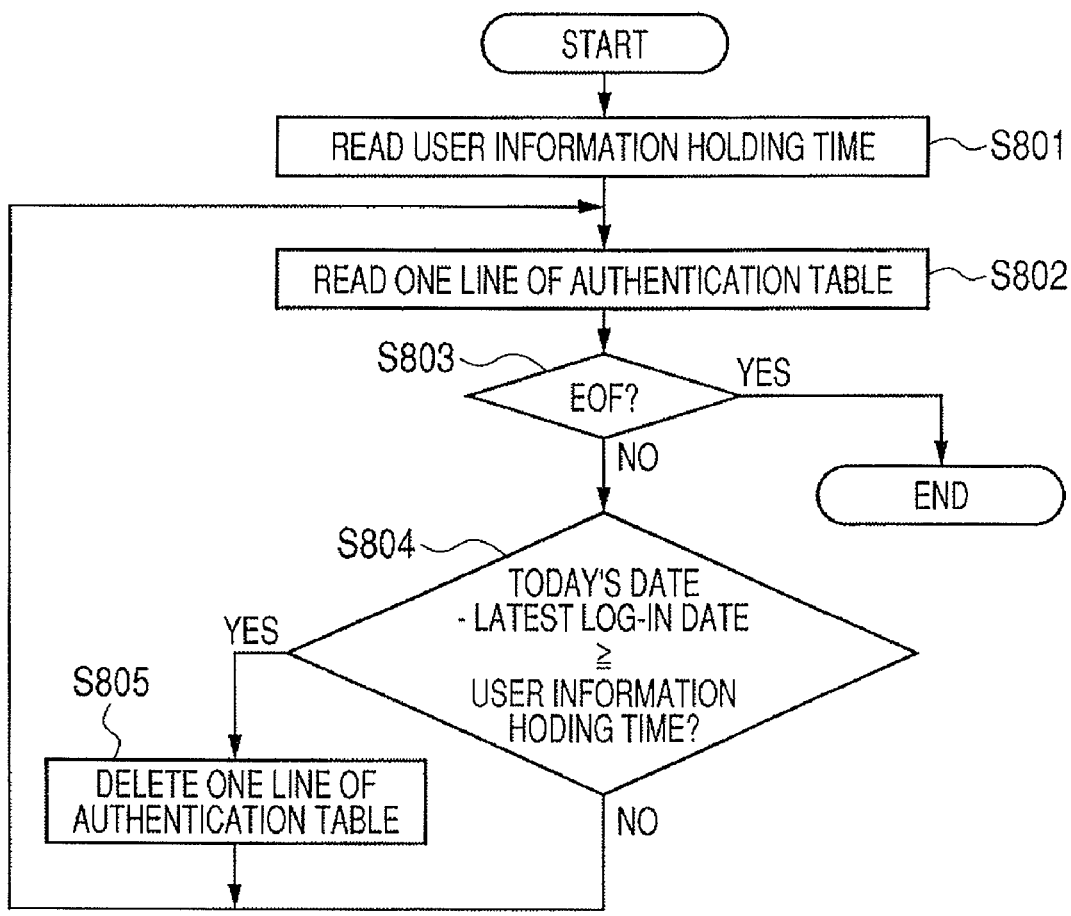
FIG. 16 is a flow chart illustrating an example of a fourth control process sequence in the print system of the present invention.
FIG. 17 is a view illustrating an example of the construction of a setting file 505 illustrated in FIG. 5.

<Description of FIG. 16>

In the following, described is a process in the deletion service 503 in the IC card authentication server 200, with reference to a flow chart illustrated in FIG. 16.

FIG. 16 is a flow chart illustrating an example of a fourth control process sequence in the print system of the present invention, corresponding to a first authentication table deletion process by the deletion service 503 in the IC card authentication server 200 illustrated in FIG. 5. Thus it is realized by executing a program read from the ROM 202 or HDD 211 into the RAM 203, by the CPU 201 of the IC card authentication server 200. In the flow chart, S801 to S805 indicate process steps.

When a first deletion process is initiated, the CPU 201 of the IC card authentication server 200 reads, in a step S801, a user information holding period ("7" in the example illustrated in FIG. 17), held by the setting file 505 illustrated in FIG. 17.

FIG. 17 is a view illustrating an example of the construction of a setting file 505 illustrated in FIG. 5.

As illustrated in FIG. 17, the setting file 505 has a user information holding period as the item, and stores a value thereof in the number of days.

In the following reference is made again to the flow chart illustrated in FIG. 16.

Then, in a step S802, the CPU 201 of the IC card authentication server 200 reads one row (corresponding to one record) of the authentication table 504 (FIG. 13), and determines, in a step S803, whether the read row is EOF.

In the case that the step S803 determines that the row read in S802 is not EOF (S803: NO), the CPU 201 of the IC card authentication server 200 proceeds to a step S804.

In the step S804, the CPU 201 of the IC card authentication server 200 determines, based on the user information holding period read in S801 and one row (card ID, user name and latest log-in date) of the authentication table 504 read in S802, whether a condition "today's (current) date–latest log-in date≧user information holding period".

In the case that the step S804 determines that the condition "today's (current) date–latest log-in date≧user information holding period" is satisfied (S804: YES), the CPU 201 of the IC card authentication server 200 deletes one row (row read in S802) from the authentication table 504 in a step S805, and returns to the step S802.

On the other hand, in the case that the step S804 determines that the condition "today's (current) date–latest log-in date≧user information holding period" is not satisfied (S804: NO), the CPU 201 of the IC card authentication server 200 returns to the step S802.

In the case that the step S803 determines that the row read in S802 is EOF (S803: YES), the CPU 201 of the IC card authentication server 200 terminates the process of the present flow chart.

In the above-described procedure, the user information (card ID, user name and latest log-in date) of the user who has not logged in the composite apparatus 100 within the user information holding period (within "7" days in the example illustrated in FIG. 17) held in the setting file 505, is deleted from the authentication table 504 by the authentication table deletion service 503. Thus a manual deletion of the user information by the manager is unnecessary, and the work of the manager can be alleviated.

The deletion service 503 may be so constructed as to be automatically activated at a predetermined time and date (for example during a nighttime) (nighttime batch process).

As described above, the print system of the present invention is capable deleting the card ID, that has elapsed a predetermined period from the latest log-in, from the authentication table 504.

The construction may be so made as to register a mail address for each user name and to include a function that the deletion service 503 monitors the latest log-in date and sends a message that the user information is to be deleted from the authentication table 504 to a mail address corresponding to the user name coupled with the card ID, immediately before the date of deletion (for example one day before (period being settable by the manager).

<Description of FIG. 16>

In the following, described is a second authentication table deletion process by the deletion service 503 in the IC card authentication server 200 illustrated in FIG. 5, with reference to a flow chart illustrated in FIG. 18.

FIG. 18 is a flow chart illustrating an example of a fifth control process sequence in the print system of the present invention, corresponding to the second authentication table deletion process by the deletion service 503 in the IC card authentication server 200 illustrated in FIG. 5. In the flow chart, processes of S1601, S1602, S1606 and S1607 are realized by executing a program read from the ROM 202 or HDD 211 into the RAM 203, by the CPU 201 of the IC card authentication server 200. Also processes of S1603 to S1605 are realized by executing a program read from the ROM 202 or HDD 211 into the RAM 203, by the CPU 201 of the directory service server 300.

When the second deletion process is initiated, the CPU 201 of the IC card authentication server 200 acquires, in a step S1601, all the user names from the authentication table 504.

Then, in a step S1602, the CPU 201 of the IC card authentication server 200 transmits, to the directory service server 300, information (including all the user names acquired in S1601) for searching whether the user names, acquired in S1601, are stored (registered) in an authentication table 1900 (second authentication table) (FIG. 19) managed by the directory service server 300.

FIG. 19 is a view illustrating a part of the authentication table 1900 (second authentication table) stored in an HD 211 of the directory service server 300.

As illustrated in FIG. 19, the authentication table 1900 managed by the directory service server 300 stores user name and password.

Now reference is made again to the flow chart in FIG. 18.

The CPU 201 of the directory service server 300 waits in a step S1603, until reception of the information (including all the user names acquired in S1601) for searching whether the user names are stored (registered) in the authentication table 1900 (S1603: NO), and, upon reception of the information for searching whether the user names are stored (registered) in the authentication table 1900 (S1603: YES), the process proceeds to a step S1604.

In a step S1604, the CPU 201 of the directory service server 300 executes a search process of the authentication table 1900 on all the user names contained in the information received in S1603, and acquires a list (search result) of user names not stored (registered) in the authentication table 1900.

Then in a step S1605, the CPU 201 of the directory service server 300 transmits the list (search result) of user names not stored (registered) in the authentication table 1900 to the IC card authentication server 200.

The CPU 201 of the IC card authentication server 200, upon receiving, from the directory service server 300, the list (search result) of user names not stored (registered) in the authentication table 1900 managed by the directory service server 300 (step S1606), proceeds to a step S1607.

In the step S1607, the CPU 201 of the IC card authentication server 200 searches the authentication table 504 based on the user names contained in the list (search result) received in S1606 to specify card IDs corresponding to the user names, and deletes such user names and the card IDs from the authentication table 504, thereupon terminating the process of the present flow chart.

In the prior technology, for example in case of a retirement of a user, the manager of the directory service server 300 has to delete the authentication information of the user registered in the authentication table 1900 (second authentication table) (FIG. 19) managed by the directory service server 300 and also to delete the authentication information of such retired user from the authentication table (first authentication table) 504 (FIG. 13) of the IC card authentication server 200.

The present exemplary embodiment is so constructed as to delete the authentication information of the user, not contained in the authentication table 1900 (second authentication table) (FIG. 19) managed by the directory service server 300, from the authentication table 504 (first authentication table) (FIG. 13) of the IC card authentication server 200, thereby alleviating the cumbersome user deleting operation of the manager.

Also the authentication information (first authentication information) such as UID of the IC card of the retired user may be made unusable according to the deletion of the authentication information (second authentication information) of the user registered in the authentication table 1900 (FIG. 19) of the directory service server.

The authentication table deletion service 503 is so constructed as to execute the second authentication table deletion process in a periodical manner.

The authentication table deletion service 503 has such a construction as to periodically enquire whether the user name registered in the authentication table 504 is present in the directory service server 300 and to delete the user name, not present in the directory service server 300, from the authentication table 504, thereby alleviating the cumbersome operations of registration or deletion of the authentication information (card ID of IC card and user name) such as UID, to be executed by the manager.

(Second Exemplary Embodiment)

In the following, there will be described, with reference to FIGS. 21 to 25, a system capable of prohibiting registration of plural IC cards (authentication information such as UID) by the user, in addition to the functions of the first embodiment.

Following description will be made on FIGS. 23A, 23B, 24A and 24B, instead of FIGS. 6 and 12 in the first embodiment.

Process steps in FIGS. 23A, 23B, 24A and 24B are represented, in the case same as those in FIGS. 6 and 12, by same step numbers as therein.

Also the process steps same as those in the first embodiment will be omitted from the following description.

Figure 23B:
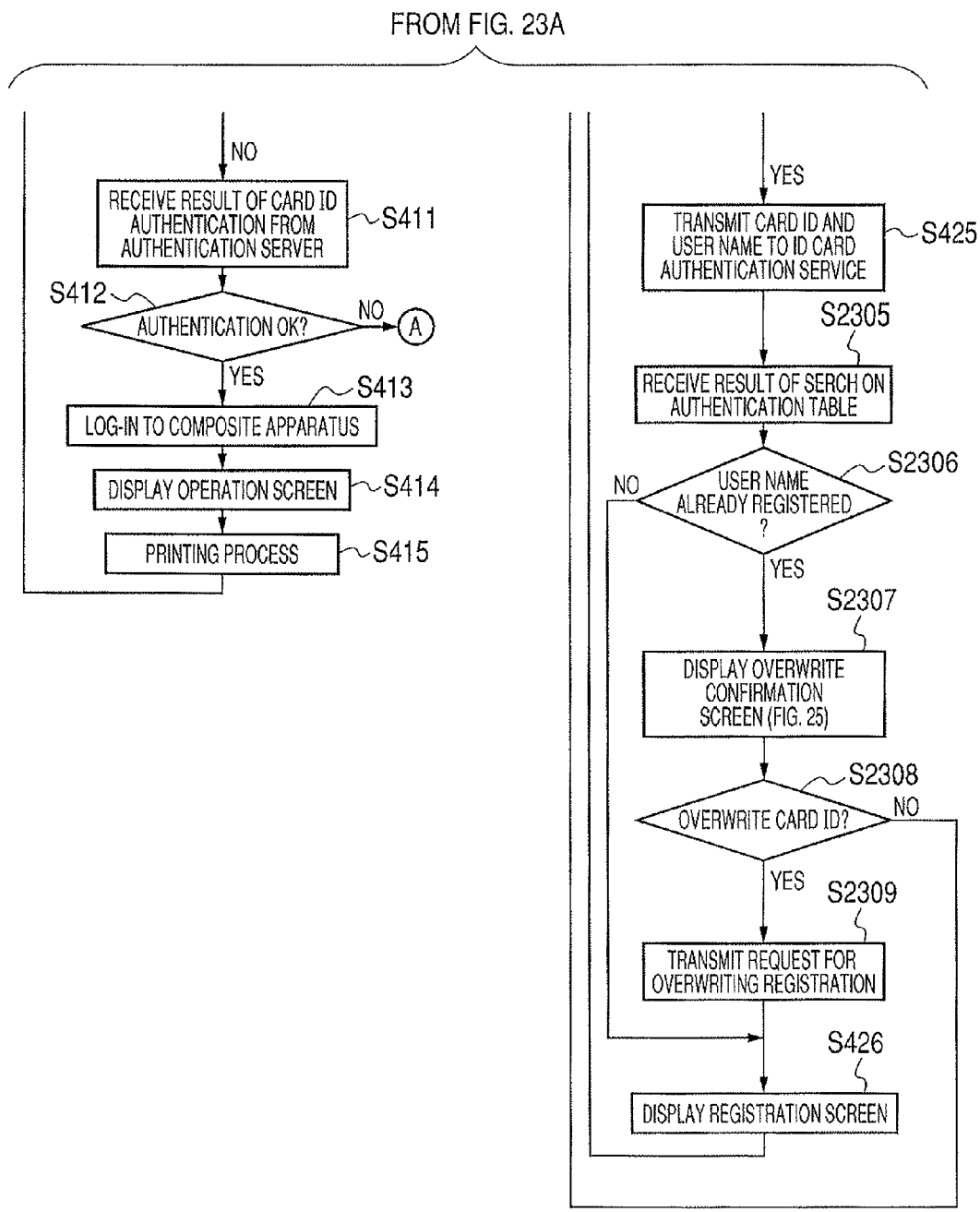
FIG. 23 which is composed of FIGS. 23A and 23B are flow charts illustrating an example of the control process sequence in a second embodiment of the print system of the present invention.

At first described, with reference to FIGS. 23A and 23B, is a process in the IC card authentication application 1011 in the composite apparatus 100.

In a step S2301, the CPU 301 of the composite apparatus 100 transmits the card ID, acquired in S405, to the IC card authentication service 501 of the IC card authentication server 200. By such transmission of the card ID to the IC card authentication service, there is requested a search for determining whether the card ID is registered in the black list table 507 (FIG. 21) and in the authentication table 504 (FIG. 13).

The IC card authentication service 501, upon receiving the black list search request, searches whether the received card ID is registered (stored) in the black list, and transmits, to the composite apparatus 100, a search result (no ID) as information permitting the registration on the authentication table in case of no registration, or a search result (ID present) as information prohibiting registration to the authentication table in case of presence of registration.

Then, in a step S2302, the CPU 301 of the composite apparatus 100 receives, from the IC card authentication service 501 of the IC card authentication server 200, a search result in a step S2404 (no ID) or a step S2405 (registration present).

Then, in the case that the step S2303 determines that the search result received in S2302 is not information permitting the registration (ID present) (S2303: YES), the CPU 301 of the composite apparatus 100 displays a registration prohibition screen illustrated in FIG. 22 on the operation unit 308 (step S2304), and awaits an instruction from the user.

FIG. 22 is a schematic view illustrating an example of a registration prohibition screen in the print system of the present invention.

FIG. 22 illustrates an OK button 2201, and, when the OK button 2201 is touched, the process returns to the step S402 to again display the log-in screen illustrated in FIG. 7.

On the other hand, in the case that the step S2303 determines that the search result received in S2302 is information permitting the registration (no ID) (S2303: NO), the process proceeds to a step S411.

(Steps S2305 to S2309

In a step S2305, the CPU 301 of the composite apparatus 100 receives the result in the step S2408 (no registration) or in the step S2409 (registration present).

In the case that the step S2306 determines that the step S2305 has received the result of the step S2409 (registration present) (step S2306: YES), the CPU 301 of the composite apparatus 100 executes the process of a step S2307, and that the step S2305 has received the result of the step S2408 (no registration) (step S2306: NO), executed is the process of the step S426. Thus, in the case that the step S2304 determines that the user name transmitted in the step S425 is not registered in the authentication table 504 but is newly registered (step S2306: NO), the CPU 301 of the composite apparatus 100 executes the process of the step S426. On the other hand, in the case of determination that the user name transmitted in the step 425 is registered in the authentication table 504 (step S2306: YES), the process of the step S2307 is executed.

Figure 25:
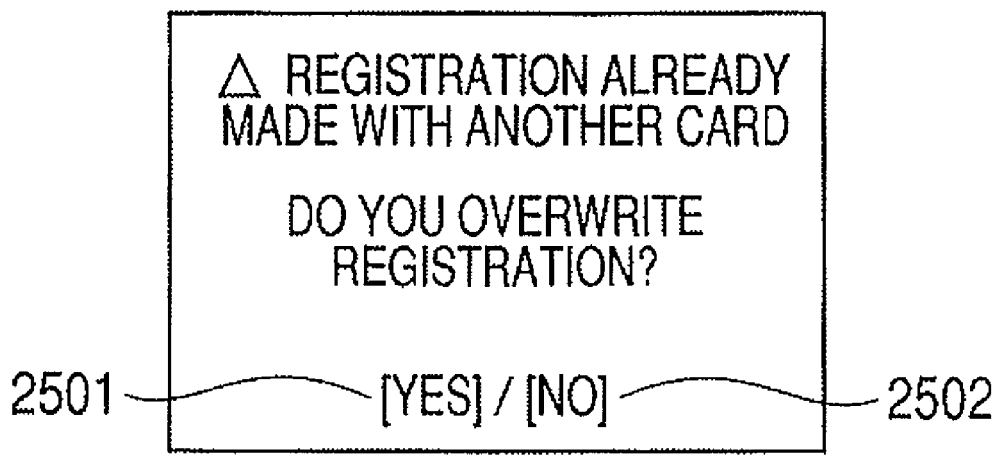
FIG. 25 is a schematic view illustrating an example of an overwrite confirmation screen in the print system of the present invention.

Then, in a step S2307, the CPU 301 of the composite apparatus 100 displays an overwrite confirmation screen in FIG. 25 on the operation unit 308, and awaits an instruction from the user.

FIG. 25 is a schematic view illustrating an example of an overwrite confirmation screen in the print system of the present invention.

In FIG. 25, a YES button 2501 is touched in case of executing a card ID overwrite registration. A NO button 2502 is touched in case of not executing the card ID overwrite registration. The user can give an instruction by selectively touching the YES button 2501 or the NO button 2502.

When the YES button 2501 or the NO button 2502 is touched, the CPU 301 of the composite apparatus 100 proceeds to a step S2308.

In the step S2308, the CPU 301 of the composite apparatus 100 determines whether the card ID overwrite registration is to be executed (the YES button 2501 is touched), and, upon determining that the card ID overwrite registration is not executed (the NO button 2502 is touched) (S2308: NO), returns to the step S402 to again display the log-in screen in FIG. 7.

On the other hand, in the case that the step S2308 determines that the card ID overwrite registration is executed (the YES button 2501 is touched) (S2308: YES), the CPU 301 of the composite apparatus 100 transmits, in a step S2309, it transmits an overwrite registration request flag to the IC card authentication service 501, then receives information of no ID from the IC card authentication service 501 in a step S426, and displays a registration completion screen illustrated in FIG. 10 (S426).

Figure 24B:
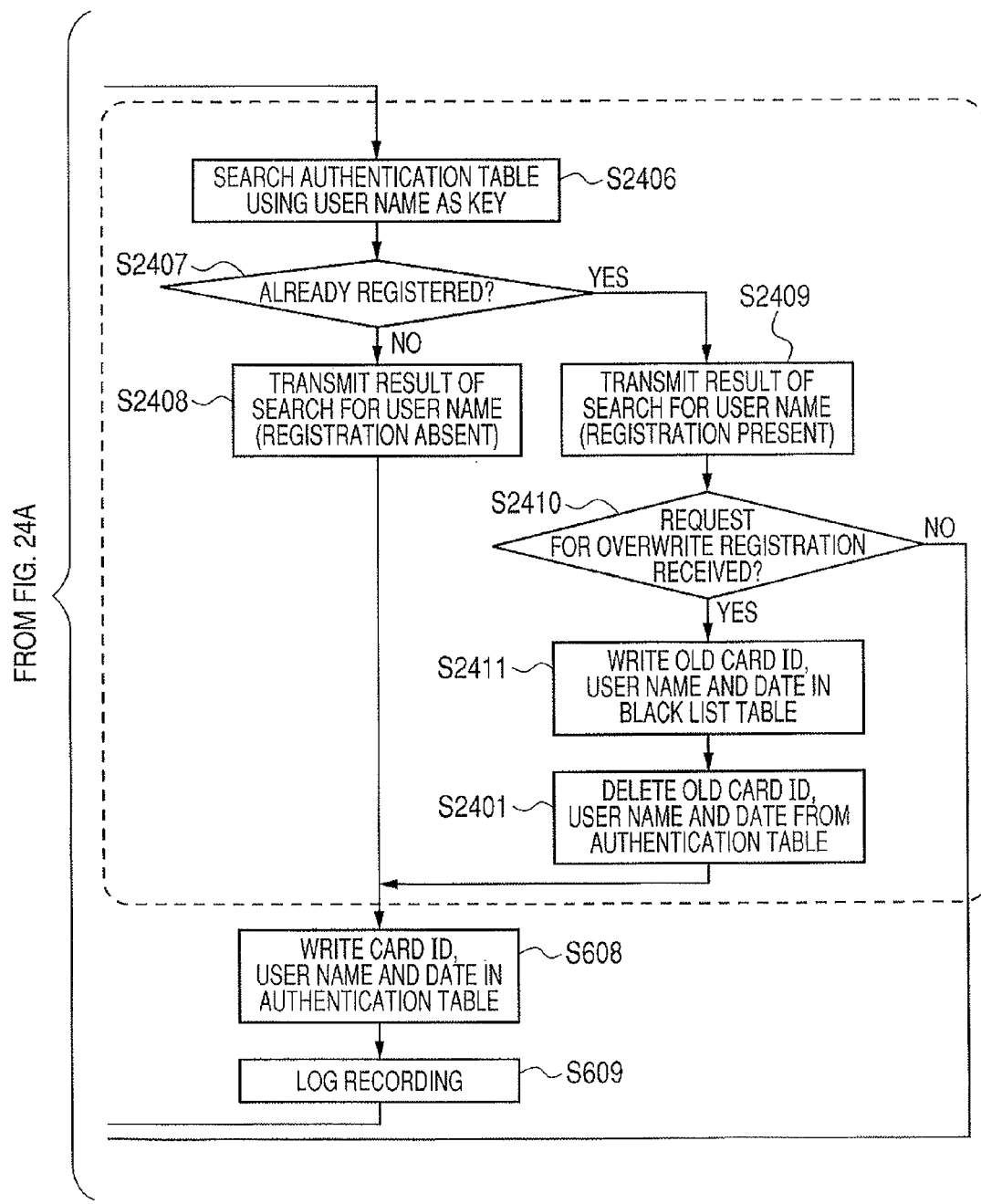
FIG. 24 which is composed of FIGS. 24A and 24B are flow charts illustrating an example of a process sequence in the IC card authentication service 501 in the second embodiment of the print system of the present invention.

In the following, described is a process in the IC card authentication service 501 in the IC card authentication server 200, with reference to a flow chart in FIGS. 24A and 24B.

At first, the CPU 201 of the IC card authentication server 200, upon receiving a card ID (user name) from the IC card authentication application 1011 of the composite apparatus 100 (S601), proceeds to a step S602.

In the step S602, the CPU 201 of the IC card authentication server 200 determines whether the received information contains the information of user name, and, upon determining that the received information does not contain the information of user name (S602: NO), recognizes that the information is information (search request) transmitted in S2301 in FIGS. 23A and 23B, thereupon proceeding to a step S2402.

On the other hand, in the case that the step S602 determines that the information received in S601 contains information of user name (S602: YES), the information is recognized as information transmitted in S425 in FIGS. 23A and 23B, and the process proceeds to a step S2406.

At first described is a process (steps S2402 to S2405) in the case that the information received in a step S602 is determined as not containing the information of user name (S602: NO).

In a step S2402, the CPU 201 of the IC card authentication server 200 searches the black list table 507 illustrated in FIG. 21, utilizing the card ID received in S601 as the key.

Then, in a step S2403, the CPU 201 of the IC card authentication server 200 determines, based on the result of search in S2402, whether the card ID received in S601 is registered in the black list table 507, and, in the case of a determination of no registration (S2403: NO), it transmits the result of search (no ID) to the IC card authentication application 1011 (S2404), and, in the case of a determination of presence of registration, it transmits the result of search (ID present) to the IC card authentication application 1011 (S2405).

After the process of the step S2404, processes of the steps S603 to S606 are executed whereupon the process is terminated. The processes of the steps S603 to S606 are described in the first embodiment and will not, therefore, be described further.

In the following, described is a process (steps S2401, S2406 to S2411) in the case that the information received in S602 is determined as containing the information of user name (S602: YES).

In a step S2406, the authentication table 504 is searched with the user name received in the step S601 as the key.

As a result, a step S2407 determines whether the user name is registered, and, in case of determining that it is registered (S2407: YES), a result of user name search (registration present) indicating that the user name is registered in the authentication table 504 is transmitted to the IC card authentication application 1011 (S2409) and then the process proceeds to a step S2410.

In the case that the user name is determined as not registered (S2407: NO), a result of user name search (no registration) indicating that the user name is not registered in the authentication table 504 is transmitted to the IC card authentication application 1011 (S2408) and then the process proceeds to a step S608.

The CPU 201 of the IC card authentication server 200, after transmitting the result of user name search (registration present) to the IC card authentication application in a step S2409, awaits, for a predetermined period, the reception of an overwrite registration request (request by step S2309) from the IC card authentication application.

In the case that the overwrite registration request is not received from the IC card authentication application 1011 within the predetermined period (step S2410: NO), the process is terminated, but, in the case that the overwrite registration request is received (step S2410: YES), the process proceeds to a step S2411.

In the step S2411, the CPU 201 of the IC card authentication server 200 specifies the user name searched in a step S2406 and the card ID corresponding to (combined with) the user name, then stores the user name, the card ID and the current date in the black list table 507 and executes the process of the step S2411.

In the step S2411, the CPU 201 of the IC card authentication server 200 deletes the card ID, the user name and the latest log-in date registered in the authentication table 504 and the process proceeds to the step S608.

The subsequent steps S608 and S609 were already described in the first embodiment and will be omitted from the description.

The above-described construction enables to prevent registration of plural IC cards (authentication information such as UID) for one user in the authentication table. It is therefore possible to prevent printing, by such user, of the print data of a person other than the user, thereby improving the security.

The present invention is not limited to the relation between the authentication information managed by the IC card authentication server 200 and the authentication information managed by the directory service server 300, but may be applied to any system in which the authentication information for each authentication server is managed by plural authentication servers.

Also the authentication information managed by the server, to which the present invention is applied, is not limited to the ID data (such as a production number of the IC card) and the user name, but the present invention is applicable to a server that manages other authentication information such as biological authentication information. Thus, the present invention is applicable to any system having plural servers that manage (register) the authentication information, regardless of the type of the authentication information.

Also another information processing apparatus may be employed instead of the composite apparatus 100.

Furthermore, the construction of the aforementioned data and the contents thereof are not those described above, but the construction and the contents may naturally be made in various manner according to the application and the purpose.

Though the present invention has been described by certain exemplary embodiments, the present invention may be realized as embodiments as a system, an apparatus, a method, a program or a recording medium, and may specifically be applied to a system constituted of plural equipment or to an apparatus constituted of a single equipment.

In the following, described with reference to a memory map in FIG. 20, is the construction of a data processing program, readable by apparatuses (composite apparatus 100, IC card authentication server 200 and directory service server 300) constituting the print system of the present invention.

FIG. 20 is a view for explaining a memory map of a recording medium (memory medium) for storing various data processing programs, readable by the apparatuses (composite apparatus 100, IC card authentication server 200 and directory service server 300) constituting the print system of the present invention.

Though not particularly illustrated, there may also be stored information for managing the programs stored in the recording medium, such as a version information and a preparing person, and information dependent on the OS of reading side such as an icon for identifying and displaying the program.

Also data belonging to the programs are managed by the directory. Furthermore, in the case that the program or data to be installed are compressed, a thawing program may also be recorded.

The functions illustrated in FIGS. 6, 12, 15, 16 and 18 in the exemplary embodiments may be executed by a host computer by an externally installed program. The present invention is applicable also in a case an information group including programs is supplied to the output apparatus by a recording medium such as a CD-ROM, a flash memory and a FD or from an external recording medium through a network.

The objects of the present invention are accomplished naturally in the case in which a recording medium storing program codes of a software realizing the functions of the aforementioned embodiments is supplied to a system or an apparatus and a computer (or CPU or MPU) of the system or the apparatus reads and executes the program codes stored in the recording medium.

In such case, the program codes themselves read from the recording medium realize the novel functions of the present invention, and the recording medium storing the program codes constitutes the present invention.

Examples of the recording medium for supplying the program codes include a flexible disk, a hard disk, an optical disk, a magnetooptical disk, a CD-ROM, a CD-R, a DVD-ROM, a magnetic tape, a non-volatile memory card, a ROM, an EEPROM and a silicon disk.

The present invention naturally includes not only a case where the functions of the aforementioned embodiments are realized by the execution of the program codes by the computer but also a case where an OS (operating system) or the like functioning on the computer executes all the actual processes or a part thereof under the instruction of the program codes thereby realizing the functions of the aforementioned embodiments.

The present invention further includes a case where the program codes read from the memory medium are written in a memory provided in a function expansion board inserted in the computer or a function expansion unit connected to the computer and a CPU or the like provided in such function expansion board or the function expansion unit executes all the actual processes or a part thereof under the instruction of the program codes thereby realizing the functions of the aforementioned embodiments.

Furthermore, the present invention may be applied to a system constituted of plural equipment or to an apparatus constituted of a single equipment. Furthermore, the present invention is naturally applicable to a case where the invention is accomplished by supplying a system or an apparatus with a program. In such case, by reading a recording medium, storing a program represented by a software for accomplishing the present invention by the system or the apparatus, such system or apparatus can enjoy the effects of the present invention.

Furthermore, by downloading and reading a program, represented by a software for accomplishing the present invention, by a communication program from a server or a database on a network, the system or the apparatus can enjoy the effects of the present invention.

Furthermore, the present invention includes all the constructions of combining the aforementioned embodiments and modifications thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-356651 filed Dec. 28, 2006, and No. 2007-318395 filed Dec. 10, 2007 which are hereby incorporated by reference herein in their entirety.

What is claimed is:

1. An information processing system, in which one or plural information processing apparatuses, a first authentication server storing first authentication information for permitting use of the information processing apparatus, and a second authentication server storing at least second authentication information for identifying a user, are capable of communication through a communication medium, wherein the first authentication server comprises:
an authentication information storing unit configured to store a first authentication information for permitting use of the information processing apparatus;
a period setting unit configured to set a period for registering the first authentication information;
a latest log-in time storing unit configured to store a latest time information at which the authentication is successful as a latest log-in time, in combination with the first authentication information;
a determination unit configured, for executing an authentication based on the first authentication information received from the information processing apparatus, to determine whether the first authentication information is stored in the authentication information storing unit;
an inquiry unit configured to inquire to the information processing apparatus registration of the first authentication information, when the determination unit determines that the first authentication information received from the information processing apparatus is not stored in the authentication information storing unit;
a first request unit configured, upon receiving a request for registration from the information processing apparatus as a response to the inquiry by the inquiry unit, to request to the second authentication server an authentication based on a second authentication information for identifying the user contained in the request for registration, wherein the second authentication information is different from the first authentication information;
a registration unit configured, in response to a reception from the second authentication server as a response to the request by the first request unit of a result indicating that the second authentication information is registered in the second authentication server, to register the second authentication information and the first authentication information that is determined by the determination unit as not stored in the authentication information storing unit in mutual combination in the authentication information storing unit; and
a deletion unit configured, when the period set by the period setting unit elapses from the latest log-in time stored in the latest log-in time storing unit, to delete the first authentication information combined with the latest log-in time and the second authentication information combined with the first authentication information from the authentication information storing unit, and wherein the information processing apparatus comprises:
a second request unit configured to transmit input first authentication information to the first authentication server thereby requesting an authentication based on the first authentication information to the first authentication server;
a result acquiring unit configured to acquire a result based on the determination by the determination unit from the first authentication server in response to the request from the second request unit;
a permission unit configured to permit use of the information processing apparatus when the authentication is determined as successful based on the result acquired by the result acquiring unit; and
a registration request unit that is configured, in the case that the authentication is determined as failed based on the result acquired by the result acquiring unit and in the case of receiving an inquiry for the registration of the first authentication information, to transmit the second authentication information for identifying the user input from an operation unit to the first authentication server thereby requesting a registration.

2. An information processing system according to claim 1, wherein the first authentication server further comprises:
a registration determination unit configured to determine whether the second authentication information, requested for registration by the registration request unit, is registered in the authentication information storing unit; and
a transmission unit configured to transmit a result of determination by the registration determination unit to the information processing apparatus;
wherein the information processing apparatus further comprises:
a registration request transmission unit that is configured, in the case that a result of determination by the registration determination unit indicates that the second authentication information is registered, to transmit, to the first authentication server, an overwrite registration request for registering the first authentication information combined with the second authentication information registered by the registration unit by overwriting the first authentication information requested by the second request unit; and
wherein the registration unit of the first authentication server, upon receiving the overwrite registration request, registers the first authentication information registered by the registration unit by overwriting the first authentication information requested by the request unit.

3. An information processing system according to claim 1, wherein the first authentication server further comprises:
a notice address registration unit configured to register a notice address in combination with the first authentication information or with the second authentication information; and
a notice unit configured, at a predetermined time before the lapse of the period set by the period setting unit from the latest log-in time stored in the latest log-in time storing unit, to send, to the notice address combined with the first authentication information or with the second authentication information, a notice that the first authentication information combined with the latest log-in time and the second authentication information combined with the first authentication information are to be deleted from the first registration unit at a predetermined time after.

4. An information processing system according to claim 1, wherein the information processing apparatus further comprises:

a log-off unit configured, in the case of an input of a first authentication information different from the first authentication information for which the use of the information processing apparatus is permitted by the permission unit, to forcedly cancel the permission of use by the first authentication information by which the use is permitted.

5. An information processing system according to claim 1, wherein the first authentication server further comprises:
a log storing unit configured to store the first authentication information and the second authentication information registered by the registration unit, together with a registration time at which the first authentication information and the second authentication information are registered by the registration unit, as a log information.

6. An authentication server capable of communication with one or plural information processing apparatuses, and a user authentication server storing at least second authentication information for identifying a user, through a communication medium, comprising:
an authentication information storing unit configured to store a first authentication information for permitting use of the information processing apparatus;
a period setting unit configured to set a period for registering the first authentication information;
a latest log-in time storing unit configured to store a latest time information at which the authentication is successful as a log-in time in combination with the first authentication information;
a determination unit configured to determine whether first authentication information received from the information processing apparatus is stored in the authentication information storing unit in order to execute an authentication based on the first authentication information;
an inquiry unit configured to inquire to the information processing apparatus registration of the first authentication information, when the determination unit determines that the first authentication information received from the information processing apparatus is not stored in the authentication information storing unit;
a first request unit that is configured, upon receiving a request for registration from the information processing apparatus as a response to the inquiry by the inquiry unit, to request to the user authentication server an authentication based on a second authentication information for identifying the user contained in the request for registration, wherein the second authentication information is different from the first authentication information;
a registration unit that is configured, when a reception from the user authentication server of a result of authentication indicating that the second authentication information is registered in the user authentication server, to register the second authentication information and the first authentication information that is determined by the determination unit as not stored in the authentication information storing unit in mutual combination in the authentication information storing unit; and
a deletion unit configured, when the period set by the period setting unit elapses from the latest log-in time stored in the latest log-in time storing unit, to delete from the authentication information storing unit the first authentication information combined with the latest log-in time and the second authentication information combined with the first authentication information.

7. A method for an information processing system, in which one or plural information processing apparatuses, a first authentication server storing first authentication information for permitting use of the information processing apparatus, and a second authentication server storing at least second authentication information for identifying a user, are capable of communication through a communication medium, wherein the first authentication server includes an authentication information storing unit configured to store a first authentication information for permitting use of the information processing apparatus, the method comprising:
in the first authentication server:
a period setting step of setting a period for registering the first authentication information;
a latest log-in storing step of storing a latest time information at which the authentication is successful as a latest log-in time in combination with the first authentication information;
a determination step of determining, for executing an authentication based on the first authentication information received from the information processing apparatus, whether the first authentication information is stored in the authentication information storing unit;
an inquiry step of inquiring to the information processing apparatus registration of the first authentication information, when the determination step determines that the first authentication information received from the information processing apparatus is not stored in the authentication information storing unit;
a first request step of, upon receiving from the information processing apparatus as a response to the inquiry a request for registration, requesting to the second authentication server an authentication based on a second authentication information for identifying the user contained in the request for registration, wherein the second authentication information is different from the first authentication information;
a registration step of registering, in response to a reception from the second authentication server as a response to the request of a result indicating that the second authentication information is registered in the second authentication server, the second authentication information and the first authentication information that is determined as not stored in the authentication information storing unit in mutual combination in the authentication information storing unit; and
a deletion step of deleting, when the period set by the period setting step elapses from the latest log-in time stored in the latest log-in time storing step, the first authentication information combined with the latest log-in time and the second authentication information combined with the first authentication information, from the authentication information storing unit, and
in the information processing apparatus:
a second request step of transmitting input first authentication information to the first authentication server thereby requesting to the first authentication server an authentication based on the first authentication information;
a result acquisition step of acquiring, from the first authentication server in response to the second request, a result based on the determination in the determination step by the first authentication server;
permitting use of the information processing apparatus when the authentication is determined as successful based on the acquired result; and
a registration request step of, in the case that the authentication is determined as failed based on the acquired result and in the case of receiving an inquiry for the registration of the first authentication information, transmitting the second authentication information for identifying the user input from an operation unit to the first authentication server, thereby requesting a registration.

8. A method executed in an authentication server which is capable of communication with one or plural information processing apparatuses, and a user authentication server storing at least second authentication information for identifying a user, through a communication medium, the authentication server including an authentication information storing unit configured to store a first authentication information for permitting use of the information processing apparatus, the method comprising:
- a period setting step of setting a period for registering the first authentication information;
- a latest log-in storing step of storing a latest time information at which the authentication is successful as a latest log-in time in combination with the first authentication information;
- a determination step of determining, for executing an authentication based on the first authentication information received from the information processing apparatus, whether the first authentication information is stored in the authentication information storing unit;
- an inquiry step of inquiring to the information processing apparatus registration of the first authentication information, when the determination step determines that the first authentication information received from the information processing apparatus is not stored in the authentication information storing unit;
- a first request step of, upon receiving from the information processing apparatus as a response to the inquiry a request for registration, requesting to the user authentication server an authentication based on a second authentication information for identifying the user contained in the request for registration, wherein the second authentication information is different from the first authentication information;
- a registration step of registering, when a reception from the user authentication server of a result of authentication indicating that the second authentication information is registered in the user authentication server, the second authentication information and the first authentication information that is determined as not stored in the authentication information storing unit in mutual combination in the authentication information storing unit; and
- a deletion step of deleting, when the period set by the period setting step elapses from the latest log-in time stored in the latest log-in time storing step, the first authentication information combined with the latest log-in time and the second authentication information combined with the first authentication information, from the authentication information storage unit.

9. A non-transitory computer-readable memory medium, on which is stored computer-executable code of a program for causing a computer to execute the method according to claim 8.

10. An information processing system according to claim 1, wherein the first authentication server further comprises:
- a black list storing unit configured to store black list information registering the first authentication information for which the use of the information processing apparatus is not permitted; and
- a search unit configured to search whether the first authentication information received from the information processing apparatus is registered in the black list information stored in the black list storing unit, and wherein the information processing apparatus further comprises:
- a search result acquiring unit configured to acquire a result of the search by the search unit; and
- a determination unit configured to determine not to permit the use of the information processing apparatus in the case that the result of search acquired by the search result acquiring unit indicates that the first authentication information is registered in the black list information.

11. An information processing system, in which one or plural information processing apparatuses, a first authentication server storing first authentication information for permitting use of the information processing apparatus, and a second authentication server storing at least second authentication information for identifying a user, are capable of communication through a communication medium,
wherein the first authentication server comprises:
- an authentication information storing unit configured to store a first authentication information for permitting use of the information processing apparatus;
- a determination unit configured, for executing an authentication based on the first authentication information received from the information processing apparatus, to determine whether the first authentication information is stored in the authentication information storing unit;
- an inquiry unit configured to inquire registration of the first authentication information to the information processing apparatus, when the determination unit determines that the first authentication information received from the information processing apparatus is not stored in the authentication information storing unit;
- a first request unit configured, upon receiving a request for registration from the information processing apparatus as a response to the inquiry by the inquiry unit, to request to the second authentication server an authentication based on a second authentication information for identifying the user contained in the request for registration, wherein the second authentication information is different from the first authentication information;
- a registration unit configured, in response to a reception from the second authentication server as a response to the request by the first request unit of a result indicating that the second authentication information is registered in the second authentication server, to register the second authentication information and the first authentication information that is determined by the determination unit as not stored in the authentication information storing unit in mutual combination in the authentication information storing unit;
- a second authentication server inquiry unit configured to inquire whether the second authentication information stored in the authentication information storing unit is registered in the second authentication server;
- a second authentication information acquiring unit configured to acquire, from the second authentication server, the second authentication information not registered in the second authentication server; and
- a deletion unit configured to delete the second authentication information acquired by the second authentication information acquiring unit and the first authentication information combined with the second authentication information, from the authentication information storing unit, and wherein the information processing unit comprises:
- a second request unit configured to transmit input first authentication information to the first authentication server thereby requesting to the first authentication server an authentication based on the first authentication information;

a result acquiring unit configured to acquire from the first authentication server in response to the request from the second request unit a result based on the determination by the determination unit;

a permission unit configured to permit use of the information processing apparatus when the authentication is determined as successful based on the result acquired by the result acquiring unit; and a registration request unit that is configured, when the authentication is determined as failed based on the result acquired by the result acquiring unit and in the case of receiving an inquiry for the registration of the first authentication information, to transmit the second authentication information for identifying the user input from an operation unit to the first authentication server thereby requesting a registration.

12. A method executed by an information processing system, in which one or plural information processing apparatuses, a first authentication server storing first authentication information for permitting use of the information processing apparatus, and a second authentication server storing at least second authentication information for identifying a user, are capable of communication through a communication medium, the method comprising:

the first authentication server performing:

an authentication information storing step of storing in an authentication information storing unit a first authentication information for permitting use of the information processing apparatus;

a determination step of, for executing an authentication based on the first authentication information received from the information processing apparatus, to determining whether the first authentication information is stored in the authentication information storing unit;

an inquiry step of inquiring registration of the first authentication information to the information processing apparatus, when the determination step determines that the first authentication information received from the information processing apparatus is not stored in the authentication information storing unit;

a first request step of, upon receiving a request for registration from the information processing apparatus as a response to the inquiry by the inquiry step, requesting to the second authentication server an authentication based on a second authentication information for identifying the user contained in the request for registration, wherein the second authentication information is different from the first authentication information;

a registration step of, in response to a reception from the second authentication server as a response to the request by the first request step of a result indicating that the second authentication information is registered in the second authentication server, registering the second authentication information and the first authentication information that is determined by the determination step as not stored in the authentication information storing unit in mutual combination in the authentication information storing unit;

a second authentication server inquiry step of inquiring whether the second authentication information stored in the authentication information storing unit is registered in the second authentication server;

a second authentication information acquiring step of acquiring, from the second authentication server, the second authentication information not registered in the second authentication server; and a deletion step of deleting the second authentication information acquired by the second authentication information acquiring step and the first authentication information combined with the second authentication information, from the authentication information storing unit, and the information processing apparatus performing:

a second request step of transmitting input first authentication information to the first authentication server thereby requesting to the first authentication server an authentication based on the first authentication information;

a result acquiring step of acquiring from the first authentication server in response to the request from the second request step a result based on the determination by the determination step;

a permission step of permitting use of the information processing apparatus when the authentication is determined as successful based on the result acquired by the result acquiring step; and a registration request step of, when the authentication is determined as failed based on the result acquired by the result acquiring step and in the case of receiving an inquiry for the registration of the first authentication information, transmitting the second authentication information for identifying the user input from an operation unit to the first authentication server thereby requesting a registration.

13. A non-transitory computer-readable memory medium, on which is stored computer-executable code of a program for causing a computer to execute the method according to claim 12.

* * * * *